US010448235B2

(12) United States Patent
Khoryaev et al.

(10) Patent No.: US 10,448,235 B2
(45) Date of Patent: Oct. 15, 2019

(54) INTER-FREQUENCY INTER-PUBLIC LAND MOBILE NETWORK (PLMN) DISCOVERY

(71) Applicant: INTEL CORPORATION, Santa Clara, CA (US)

(72) Inventors: Alexey Khoryaev, Nizhny Novgorod (MD); Sergey Panteleev, Nizhny Novgorod (RU); Debdeep Chatterjee, San Jose, CA (US); Mikhail Shilov, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/557,070

(22) PCT Filed: Dec. 24, 2015

(86) PCT No.: PCT/US2015/000357

§ 371 (c)(1),
(2) Date: Sep. 8, 2017

(87) PCT Pub. No.: WO2016/163971

PCT Pub. Date: Oct. 13, 2016

(65) Prior Publication Data

US 2018/0070219 A1 Mar. 8, 2018

Related U.S. Application Data

(60) Provisional application No. 62/144,777, filed on Apr. 8, 2015.

(51) Int. Cl.
*H04W 4/00* (2018.01)
*H04W 8/00* (2009.01)
(Continued)

(52) U.S. Cl.
CPC ........... *H04W 8/005* (2013.01); *H04W 48/12* (2013.01); *H04W 48/16* (2013.01); *H04W 76/14* (2018.02); *H04W 84/042* (2013.01)

(58) Field of Classification Search
CPC ..... H04W 48/12; H04W 48/16; H04W 76/14; H04W 84/042; H04W 8/005
(Continued)

(56) References Cited

U.S. PATENT DOCUMENTS

2015/0043448 A1 2/2015 Chatterjee et al.

OTHER PUBLICATIONS

3GPP TSG-RAN WG2 Meeting #89bis (R2-151115); ProSe discovery for inter-carrier and inter-PLMN; Agenda Item 7.5.3; Bratislava, Slovakia; Apr. 20-24, 2015.
(Continued)

*Primary Examiner* — Charles T Shedrick
(74) *Attorney, Agent, or Firm* — Thorpe North & Western

(57) ABSTRACT

A user equipment (UE) can receive, from an eNodeB, a serving PLMN system information block (SIB)19 for a carrier frequency of a serving PLMN of the UE. The UE can acquire inter-frequency and inter-PLMN discovery system information acquisition assistance signaling information from the SIB19. The UE can process a non-serving PLMN SIB19 for one or more carrier frequencies of a non-serving PLMN using the inter-frequency and inter-PLMN discovery system information acquisition assistance signaling information. The UE can identify inter-frequency and inter-PLMN discovery announcement rate information and monitoring control configuration information for the one or more carrier frequencies of the non-serving PLMN to enable the UE to perform device-to-device (D2D) discovery with a UE in the non-serving PLMN according to the inter-frequency and inter-PLMN discovery announcement rate information and monitoring control configuration information.

22 Claims, 11 Drawing Sheets

100
eNB
104
UE 108
Tx
Rx
UE 108
UE 110
D2D
Communication

(51) Int. Cl.
*H04W 48/12* (2009.01)
*H04W 48/16* (2009.01)
*H04W 76/14* (2018.01)
*H04W 84/04* (2009.01)

(58) Field of Classification Search
USPC .......................................................... 455/434
See application file for complete search history.

(56) References Cited

OTHER PUBLICATIONS

3GPP TSG-RAN WG1 Meeting #80bis (R1-151441); D2D Discovery Support in the Presence of Multiple Carriers and PLMNs; Agenda item: 7.2.3.1.2; Belgrade, Serbia; Apr. 20-24, 2015.
3GPP TSG-RAN WG1 Meeting #81 (R1-152629); D2D Discovery Support in the Presence of Multiple Carriers and PLMNs; Agenda item: 6.2.3.2.2; Fukuoka, Japan; May 25-29, 2015.
3GPP TSG-RAN WG2 Meeting #89 (R2-150645); Corrections to stage 2 description of ProSe—Change Request; Athens, Greece; Feb. 9-13, 2015.
3GPP TSG-RAN WG2 Meeting #87bis (R2-144541); Configuration Aspects for ProSe Discovery; Agenda item: 7.3.3.1 Shanghai, China; Oct. 6-10, 2014.
3GPP TS 36.331 V12.5.0; Evolved Universal Terrestrial Radio Access (E-UTRA); Radio Resource Control (RRC); Protocol specification (Release 12); Mar. 2015.

200

```
SL-DiscResourcePool-r12 ::=        SEQUENCE  {
    cp-Len-r12                         SL-CP-Len-r12,
    discPeriod-r12                 ENUMERATED {rf32, rf64, rf128,
                                           rf256, rf512, rf1024, spare2, spare},
    numRetx-r12                    INTEGER (0..3),
    numRepetition-r12                  INTEGER (1..50),
    tf-ResourceConfig-r12              SL-TF-ResourceConfig-r12,
    txParameters-r12               SEQUENCE {
        txParametersGeneral-r12        SL-TxParameters-r12,
        ue-SelectedResourceConfig-r12 SEQUENCE {
            poolSelection-r12          CHOICE {
                rsrpBased-r12              SL-PoolSelectionConfig-r12,
                random-r12                     NULL
            },
            txProbability-r12          ENUMERATED {p25, p50, p75, p100}
            nonServingTxProbability-r13          ENUMERATED {p25, p50, p75, p100}
        }                                                  OPTIONAL    -- Need OR
    }                                                      OPTIONAL,   -- Cond Tx
    rxParameters-r12               SEQUENCE {
        tdd-Config-r12                 TDD-Config              OPTIONAL,   -- Need OR
        syncConfigIndex-r12            INTEGER (0..15)
    }                                                      OPTIONAL,   -- Need OR
    ...
}
...
```

*txProbability*

Indicates the probability of transmitting announcement in a discovery period when configured with a pool of resources, see TS 36.321.

*<u>nonServingTxProbability</u>*

<u>Indicates the probability of transmitting discovery announcement in a discovery period when configured with a pool of resources, when transmitting in a non-serving carrier, see TS 36.321.</u>

*SystemInformationBlockType19* information element

```
-- ASN1START
SystemInformationBlockType19-r12 ::= SEQUENCE {
    discConfig-r12                      SEQUENCE {
        discRxPool-r12                      SL-DiscRxPoolList-r12,
        discTxPoolCommon-r12                SL-DiscTxPoolList-r12           OPTIONAL,     -- Need OR
        discTxPowerInfo-r12             SL-DiscTxPowerInfoList-r12      OPTIONAL,     -- Cond Tx
        discSyncConfig-r12                  SL-SyncConfigList-r12           OPTIONAL     -- Need OR
    }                                                                       OPTIONAL,     -- Need OR
    discInterFreqList-r12           SL-CarrierFreqInfoList-r12      OPTIONAL,     -- Need OR
    lateNonCriticalExtension        OCTET STRING                    OPTIONAL,
    ...
}
SL-CarrierFreqInfoList-r12 ::=   SEQUENCE (SIZE (1..maxFreq)) OF SL-CarrierFreqInfo-r12
SL-CarrierFreqInfo-r12::=        SEQUENCE {
    carrierFreq-r12                 ARFCN-ValueEUTRA-r9,
    plmn-IdentityList-r12       PLMN-IdentityList4-r12          OPTIONAL     -- Need OP
    plmn-AnnouncementRateList-r13       PLMN-AnnouncementRateList-r13       OPTIONAL     -- Need OP
}
PLMN-IdentityList4-r12 ::= SEQUENCE (SIZE (1..maxPLMN-r11)) OF PLMN-IdentityInfo2-r12

PLMN-IdentityInfo2-r12 ::=       CHOICE  {
    plmn-Index-r12                  INTEGER (1..maxPLMN-r11),
    plmnIdentity-r12            PLMN-Identity
}
PLMN-AnnouncementRateList-r13 ::=    SEQUENCE (SIZE (1..maxPLMN-r11)) OFPLMN-AnnouncementRateInfo-r13
PLMN-AnnouncementRateInfo-r13 ::=        ENUMERATED {p25, p50, p75, p100}
}-- ASN1STOP
```

*PLMN-AnnouncementRateInfo-r13*

Transmission probability of discovery in current non-serving carrier corresponding to current PLMN.

INTER-FREQUENCY INTER-PUBLIC LAND MOBILE NETWORK (PLMN) DISCOVERY

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) and a sidelink (SL) transmissions. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

Additionally, in 3rd generation partnership project (3GPP) long term evolution (LTE) Release 12, Device to device D2D discovery functionality is introduced to enable D2D service. With direct D2D communication, a user equipment (UE) can communicate directly with each other without or with partial involvement of a base station or an evolved node B (eNB). One issue with D2D communication is device discovery to enable D2D service. Furthermore, challenges arise in inter-frequency and inter-PLMN D2D discovery for D2D communication in a same or different public land mobile network (PLMN).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 2 illustrates an optional procedure for configuring announcement for a not-served UE in a SIB19 of a particular pool in an operator controlled carrier in accordance with an example;

FIG. 3 illustrates an optional procedure for configuring non-serving announcement rate in a frequency list of an SIB19 of a serving carrier in accordance with an example;

Figure 1:
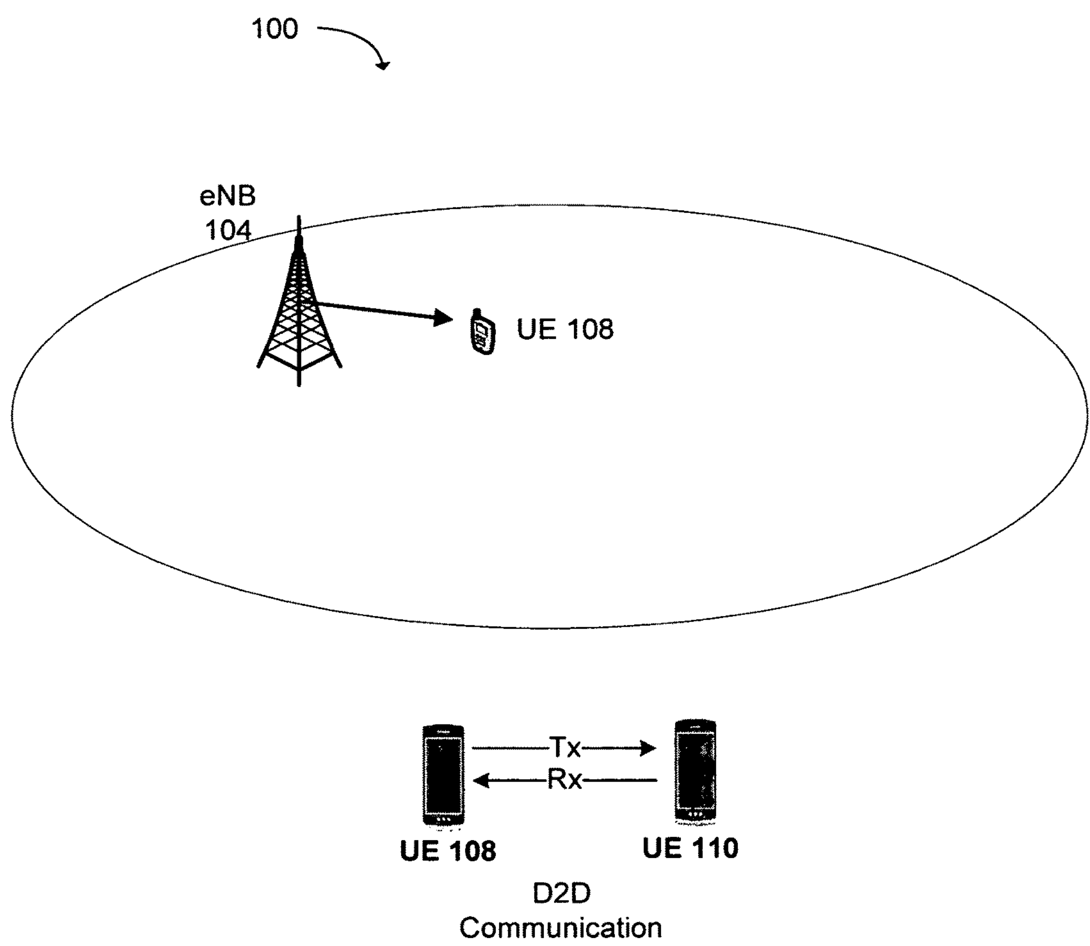
FIG. 1 illustrates a mobile communication network within a cell and D2D communication in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one aspect, 3GPP radio access network (RAN) LTE system can include an evolved universal terrestrial radio access network (E-UTRAN), which can include a plurality of evolved Node-Bs (eNBs) and communicates with a plurality of mobile stations, also referred as user equipment (UEs). The radio protocol stacks of E-UTRAN are given including a radio resource control layer (RRC), a packet data convergence protocol layer (PDCP), a radio link control layer (RLC), a media access control layer (MAC), and a physical layer (PHY).

In 3rd generation partnership project (3GPP) long term evolution (LTE) Release 12, Device to device (D2D) discovery functionality is defined to enable D2D service. With direct D2D communication (e.g.,"sidelink direct communication"), a user equipment (UE) can communicate directly with one or more D2D UEs without or with partial involvement of a base station or an evolved node B (eNB). Sidelink physical channels can carry synchronization related signals and information on a physical sidelink broadcast channel (PSBCH), device-to-device discovery using physical sidelink discovery channel (PSDCH), device-to-device communication (e.g. voice service) data using a physical sidelink shared channel (PSSCH), and control signaling using a physical sidelink control channel (PSCCH). The functionality of sidelink physical channels can enable D2D discovery and D2D communication, such as in a one to one (e.g., 1:1) or one to many (e.g.,1:many) D2D communication.

In one aspect, a UE can announce a Sidelink (i.e. Device-to-device or D2D) discovery message only on a serving cell (e.g., a camping cell) when RRC_IDLE or PCell when RRC_CONNECTED. For reception, the UE can monitor discovery resources in the serving cell frequency as well as other frequencies in same or different Public Land Mobile Networks (PLMNs). For intra-frequency discovery, a serving cell can provide a full configuration of discovery resource pools used in neighboring cells on a particular frequency. For the inter-frequency case, an eNB can provide a frequency list where D2D is enabled, while the discovery resource pool configuration and thus other transmission parameters can be assumed to be acquired by a UE through a system information block, such as System Information Block 19 (SIB19) transmitted on corresponding frequencies for each carrier frequency.

In one aspect, enhanced D2D discovery support can be provided in the presence of multiple carriers and PLMNs. The enhanced D2D discovery can allow D2D transmissions in a non-serving carrier and/or a secondary cell belonging to the same and/or different PLMN as the serving cell. Thus, D2D discovery can be extended to support transmission on multiple carriers. In addition, enhanced D2D discovery can simplify D2D discovery reception over multiple carriers. However, in order to enhance D2D discovery support in a non-serving carrier and/or secondary cell belonging to the same and possibly different PLMN as the serving cell, the following challenges and parameters are considered: 1) acquisition of D2D discovery configuration parameters; 2) discovery announcement and monitoring at multiple carriers; and 3) minimization of the impact on Uu interface in terms of Uu transmissions and receptions.

Thus, the present technology provides a solution for enhanced inter-frequency and inter-PLMN D2D discovery that resolve the mentioned above problems. The proposed solutions simplify acquisition of inter-frequency discovery configuration information, control inter-PLMN discovery announcement rate to handle different UE loadings (at different carriers belonging to different operators) and minimize impact on the Uu (air) interface.

In one aspect, the present technology introduces additional RRC signaling to enable and improve inter-frequency and inter-PLMN discovery. First, a non-serving SIB19 configuration can be acquired by usage of acquisition assistance messages. The acquisition assistance messages can be sent using RRC signaling between a UE and a serving eNB. Second, the transmission rate can be controlled on a non-serving frequency/PLMN by configuring higher layer parameters (e.g. announcement rate signaling or transmission windows) that can be known and coordinated among operators (i.e. PLMNs). The announcement rate can be explicitly signaled or implicitly configured per discovery resource pool configuration for the non-serving transmission.

In one aspect, inter-frequency and inter-PLMN discovery can be performed by providing a frequency and PLMN list where only discovery monitoring (reception) can be additionally performed. Also, in one aspect, the discovery announcement (transmission) can also be provided. The discovery announcement on non-serving carriers can be enabled by using non-serving SIB19 configurations for transmission and reception. However, in that case, the transmissions of not-served UEs (e.g., UEs served by other operators (PLMN)) in a serving carrier may not be controllable, leading to unsatisfactory discovery performance on current carrier/PLMN. For example, if an amount of UEs that are served by operator A significantly exceeds an amount of UEs served by operator B, then discovery announcement of terminals that belong to operator A on carrier B, will significantly decrease the successful discovery rate among terminals served by operator B, and operator B may not have the ability to control the transmissions.

In one aspect, the present technology uses RRC signaling messages to allow eNBs and operators/PLMNs to control a transmission rate and interference load from not-served UEs. In addition, inter-PLMN alignment of discovery transmission and reception intervals can improve discovery performance. In particular, inter-PLMN alignment of discovery transmission and reception intervals can help avoid situations such as, for example, when two UEs cannot discover each other because they never transmit and receive on the same frequency. In order to avoid this, the scheduling of inter-PLMN discovery announcement and or monitoring can be introduced and depend on inter-PLMN identity, which is currently transmitted jointly with SIB19 discInterFreqList. The "discInterFreqList" can be a field in an abstract syntax notation one (ASN.1) RRC signaling contained in the SIB19. The discInterFreqList can Indicate the neighboring frequencies on which sidelink direct discovery announcement is supported.

It should be noted that in regards to inter-PLMN alignment of discovery transmission and reception intervals, there can be different operators (PLMNs) that have no coordination of configuring discovery resources in the carriers of the different operators (PLMNs). Thus, transmission and reception resources (i.e. intervals) may not aligned and may either overlap, partially overlap or do not overlap. In one aspect, a UE can be configured with reception interval for inter-frequency/PLMN discovery which is orthogonal to discovery resource pool in another carrier, thus the UE cannot discover other UEs from another carrier because the monitoring/reception interval of the UE is not aligned with transmission of UEs in another carrier.

Additionally, the inter-frequency discovery can be performed only after acquisition of a corresponding SIB19. The acquisition process can consume additional processing from a UE receiver. To reduce this increased processing overhead, the present technology introduces RRC messages and reduces the time for acquisition of discovery configuration at inter-PLMN carriers. In an additional aspect, demodulation reference signals (DMRS) dependent on a PLMN identity or carrier frequency.

In one aspect, the technology provided herein provides performing inter-frequency and inter-public land mobile network (PLMN) discovery is disclosed. A user equipment (UE) can receive, from an eNodeB, a serving PLMN system information block (SIB) 19 for a carrier frequency of a serving PLMN of the UE. The UE can acquire inter-frequency and inter-PLMN discovery system information acquisition assistance signaling information from the SIB19. The UE can process a non-serving PLMN SIB19 for one or more carrier frequencies of a non-serving PLMN using the inter-frequency and inter-PLMN discovery system information acquisition assistance signaling information. The UE can identify inter-frequency and inter-PLMN discovery announcement rate information and monitoring control configuration information for the one or more carrier frequencies of the non-serving PLMN to enable the UE to perform device-to-device (D2D) discovery with a UE in the non-serving PLMN according to the inter-frequency and inter-PLMN discovery announcement rate information and monitoring control configuration information.

In one aspect, user equipment (UE) can receive, from an eNodeB, a serving PLMN system information block (SIB) 19 for a carrier frequency of a serving PLMN of the UE. The UE can acquire inter-frequency and inter-PLMN discovery system information acquisition assistance signaling information from the SIB19. The UE can process a non-serving PLMN SIB19 for one or more carrier frequencies of a non-serving PLMN using the inter-frequency and inter-PLMN discovery system information acquisition assistance signaling information. The UE can identify inter-frequency and inter-PLMN discovery system information acquisition assistance signaling information from the SIB19. The UE can process a non-serving PLMN SIB19 for one or more carrier frequencies of a non-serving PLMN using the inter-frequency and inter-PLMN discovery system information acquisition assistance signaling information to enable the UE to perform device-to-device (D2D) discovery with a UE in the non-serving PLMN according to the inter-frequency and inter-PLMN discovery announcement rate information and monitoring control configuration information.

In one aspect, an eNodeB can process the inter-frequency and inter-PLMN discovery system information acquisition assistance signaling information received from one or more non-serving PLMNs or from one or more non-serving cells. The eNodeB can process, for transmission to the UE, a serving PLMN system information block (SIB)19 for a carrier frequency of a serving PLMN of the UE to enable the UE to acquire inter-frequency and inter-PLMN discovery system information acquisition assistance signaling information from the SIB19. The eNodeB can process, for transmission to the UE, using the inter-frequency and inter-PLMN discovery system information acquisition assistance signaling information, a non-serving PLMN SIB19 for one or more carrier frequencies of a non-serving PLMN to enable the UE identify inter-frequency and inter-PLMN discovery announcement rate information and monitoring control configuration information for the one or more carriers frequency of the non-serving PLMN to enable the UE to perform device-to-device (D2D) discovery with a UE in the non-serving PLMN according to the inter-frequency and inter-PLMN discovery announcement rate information and monitoring control configuration information.

FIG. 1 illustrates a mobile communication network within a cell 100 having an evolved node B (eNB) with a mobile device. FIG. 1 illustrates an eNB 104 that can be associated with an anchor cell, macro cell or primary cell. Also, the cell 100 can include mobile device, such as, for example, a User equipment (UE or UEs) 108 that can be in communication with the eNB 104. The eNB 104 can be a station that communicates with the UE 108 and can also be referred to as a base station, a node B, an access point, and the like. The eNB 104 can be a high transmission power eNB, such as a macro eNB, for coverage and connectivity. The eNB 104 can be responsible for mobility and can also be responsible for radio resource control (RRC) signaling. User equipment (UE or UEs) 108 can be supported by the macro eNB 104. The eNB 104 can provide communication coverage for a particular geographic area. In 3GPP, the term "cell" can refer to a particular geographic coverage area of eNB and/or an eNB subsystem serving the coverage area, depending on the context in which the term is used.

In one aspect, device-to-device (D2D) communication can be performed. For example, UE 108 can perform D2D communication with UE 110. In one aspect, UE 108 can be considered a transmitting UE (Tx UE) and UE 110 can be considered a receiving UE (Rx UE) or visa versa. In one aspect, UEs 108, 110 can both be a serving UE in cell 100. In one aspect, UE 108 can be a serving UE in cell 100 (e.g., a serving Cell) and UE 110 can be a non-serving UE located outside the cell 100 (e.g., located in a non-serving cell that can be a neighboring cell to the serving cell 100).

Enhanced Inter-frequency and Inter-PLMN SIB19 Acquisition.

In one aspect, D2D discovery transmission (announcement) can be limited to a serving carrier, while D2D discovery reception (monitoring) can be done over multiple carriers. However, in order to receive discovery signals on a non-serving carrier, a UE can be configured to read SIB19 on a non-serving carrier and acquire D2D discovery configuration parameters. However, this procedure can last a long time (e.g., greater than 5 seconds (s), such as, for example reading of a SIB 19 in another carrier may last up to ~5 seconds or even more in case of bad signal quality) since the UEs may synchronize to a non-serving carrier, read master information block (MIB), system information block 1 (SIB1), and extract SIB scheduling info and read SIB19. This procedure can use multiple switches of a reception (RX) chain between the serving and non-serving carrier, but, increases power consumption and time to acquire discovery configuration settings.

In one aspect, if a single operator serves multiple carriers, then acquisition of D2D discovery information on multiple carriers that belong to the same operator can be performed. In one aspect, an operator can completely control discovery resources across carriers. Therefore, an eNB can have complete information about discovery resource configuration for one or more carriers. In addition, an operator can have freedom to configure resources on multiple carriers in a way to optimize certain D2D discovery metric, such as, for example, reduce discovery latency and/or reduce terminal power consumption. In one aspect, in order to simplify acquisition of discovery information from multiple carriers of the same operator, eNB can directly inform UEs about inter-frequency discovery configuration parameters by adding this information into SIB19 or introducing any additional RRC signaling.

In one aspect, if different operators serve different carriers, then, by default the inter-frequency discovery configuration is not available. However, the inter-frequency discovery configuration information may be exchanged between operators if it is expected to be shared on the serving carrier. It should be noted that operators can exchange only partial information. For example, in one aspect, the transmission timing of the SIB19 can be directly indicated so that UE can detect the transmission timing, when the UE performs switching, without processing the SIB1 and waiting for the SIB19.

In cases for both the same or different operator, acquisition assistance signaling can be performed for efficient inter-frequency discovery. In one aspect, small-size (e.g., 10 or 10 times smaller than a complete SIB19) assistance information signaling can be placed in a serving cell's SIB19. That is, the assistance information can be much smaller, such as, for example, 10 or 100 times) as compared to a full or complete SIB19 of another PLMN/carrier.

For example, the small-size assistance information signaling can be placed in a serving cell's SIB19 because complete discovery resource configuration information, carried in a SIB19, can take many bytes. In one aspect, the following options may be used to provide assistance for inter-frequency discovery.

Option 1

In one aspect, the present technology provides inter-frequency system scheduling information. For example, the inter-frequency system scheduling information can include bandwidth, power, system information radio network temporary identifier (SI-RNTI), SIB1 and SIB19 scheduling info. Option 1 allows inter-frequency discovering UEs to skip some processing steps of the non-serving cells and directly acquire SIB19 using this scheduling information.

Option 2

In one aspect, the present technology provides information about time windows in order to assist SIB19 acquisition in non-serving carriers. The information can be directly applied if cells from different carriers are synchronized and there are no unbounded clock drift. That is, in order for communication to be achieved in an OFDMA communication system, such as 3GPP LTE, the UEs are synchronized with the eNBs. In other words, an eNBs can be synchronized within some error bounds that may allow to use the option of assistance. Accordingly, for UEs to communicate with non-serving eNBs in other PLMNs, the UEs can be synchronized with the non-serving eNB, or the non-serving eNB can be synchronized with the serving eNB. In case of asynchronous cells/carriers, the information may be periodically exchanged over an X2 application protocol (X2AP) interface in order to compensate clock drift effects and regularly communicated to UEs. In addition, a serving eNB can signal (e.g., signal dedicated RRC reconfiguration information) to one or more UEs if configuration parameters on inter-PLMN frequencies were updated (discovery change notification).

Option 3

In one aspect, the present technology provides, if the cells from different carriers are not co-located, then, in case of asynchronous deployments (at least in the non-serving carriers), the scheduling information with respect to the time windows for SIB scheduling can be different in different cells of the non-serving carrier.

In one aspect, the present technology provides a solution to indicate the acquisition assistance signaling following either Option 1 or Option 2 (with respect to assistance information content) for a set of neighboring cells on the non-serving carrier that are geographically proximal to the serving or camping cell of the serving PLMN. Specifically, a set of neighboring cells on the non-serving carrier can be indexed by the set of neighboring cells' PLMN IDs and Physical Cell IDs and corresponding the acquisition assistance information for each of the cells can be provided by the serving or camping cell of the serving carrier.

Enhanced Monitoring and Announcing on a Non-serving PLMN.

In one aspect, the discovery announcement on a non-serving carrier can be specified. In order to support discovery announcement on inter-PLMN carriers additional signaling to control announcement behavior can be configured. In particular, the ability to control such transmissions from the perspective of the serving eNB/carrier or the non-serving eNB/carrier may be introduced.

Control of UE Transmissions from the Serving eNB/PLMN Perspective

Since a UE can have limited transmission capabilities (e.g. single transmission (TX) and/or single reception (RX) chain), then discovery announcement, monitoring in a non-serving carrier may introduce interruption periods due to switch for another carrier. According to RAN4 studies, it may consume up to 1 ms interruption to tune from one to another carrier.

Control of UE Transmission from the Non-serving eNB/PLMN Perspective

It should be noted that discovery pools on each carrier can have a different amount of resources and a different congestion situation due to a different amount of users interested in discovery. An operator may also want to control maximum discovery transmission rate for terminals from other operators. Controlling the maximum discovery transmission rate for terminals from other operators can depend on amount of D2D discovery capable UEs served by each operator and amount of resources operator is willing to allocate to D2D discovery operation.

For this purposes, the discovery parameters specific for non-serving (e.g., "alien" or unknown) UEs can be signaled in a new field of SIB19. In particular, non-serving frequency/PLMN announcement rate may be configurable through dedicated fields in SIB19. The announcement rate can be either a part of the serving SIB19 signaling related to inter-frequency discovery information or can be specified in a resource pool configuration stored in the non-serving frequency' SIB19.

In one aspect, one or more several options defined herein control the discovery transmission rate.

Option 1

In one aspect, a transmission probability can be used on a non-serving carrier.

That is, the a transmission probability can be configured to transmit an announcement message in current discovery period.

Option 1*a*.

In one aspect, as depicted in FIG. 2, an announcement rate can be configured for a not-served UEs in a SIB19 of a particular resource pool in an operator controlled carrier. The announcement rate can be configured for not-served UEs in a SIB19 of particular pool in an operator controlled carrier. For example, as depicted in the pseudo code, a transmission probability (e.g., "TxProbability" of the pseudo code) can be defined as the probability of transmitting an announcement (e.g., announcement discovery signal) in a discovery period when configured with a pool of resources. Also, a non-serving transmission probability (e.g., "non-ServingTxProbability" of the pseudo code) can be defined as indicating the probability of transmitting discovery announcement in a discovery period when configured with a pool of resources when transmitting in a non-serving carrier. In one aspect, the probability of transmitting an announcement can be associated with a PLMN identity so that discovery announcement rate can be different for different PLMNs.

Option 1*b*.

In one aspect, as depicted in FIG. 3, SIB19 can be configured with an additional information element. That is, the pseudo code of FIG. 3, a non-serving announcement rate can be configured in a frequency list of a SIB19 of a serving carrier. For example, as depicted in the pseudo code for an SIB19 information element the announcement rate (e.g., "PLMN-AnnouncementRateInfo-r13" of the pseudo code)

can be defined as the transmission probability of discovery in current non-serving carrier corresponding to a current PLMN.

In one aspect, Option 1*b* illustrates how an abstract syntax notation one (ASN.1) can be modified in order to include the transmission probability into the SIB19 of the serving cell using a new "plmn-AnnouncementRateList-r13" field (e.g., the announcement rate).

Option 1*c*.

In one aspect, a priority list can be configured for inter-frequency discovery announcement and inter-frequency discovery monitoring according to the order in discInterFreqList or plmnIdentityList. The "plmnIdentityList" can be a list of PLMN identities for the neighboring frequency indicated by a carrier frequence. Absence of the field indicates the same PLMN identities as listed in plmn-IdentityList (without suffix) in SystemInformationBlockType1. In other words, the plmnIdentityList can be a part of "discInterFreqList" and overall the list indicates the frequencies and PLMNS where discovery announcement is supported. That is, Option 1*c* prioritizes announcements and monitoring in some frequencies and/or PLMNs using a priority list corresponding to each carrier frequency and/or PLMN. As such, a frequency and/or PLMN with higher priority can be used for announcement and monitoring with higher probability (e.g. in case of resource pool overlap).

Option 2

Figure 4:
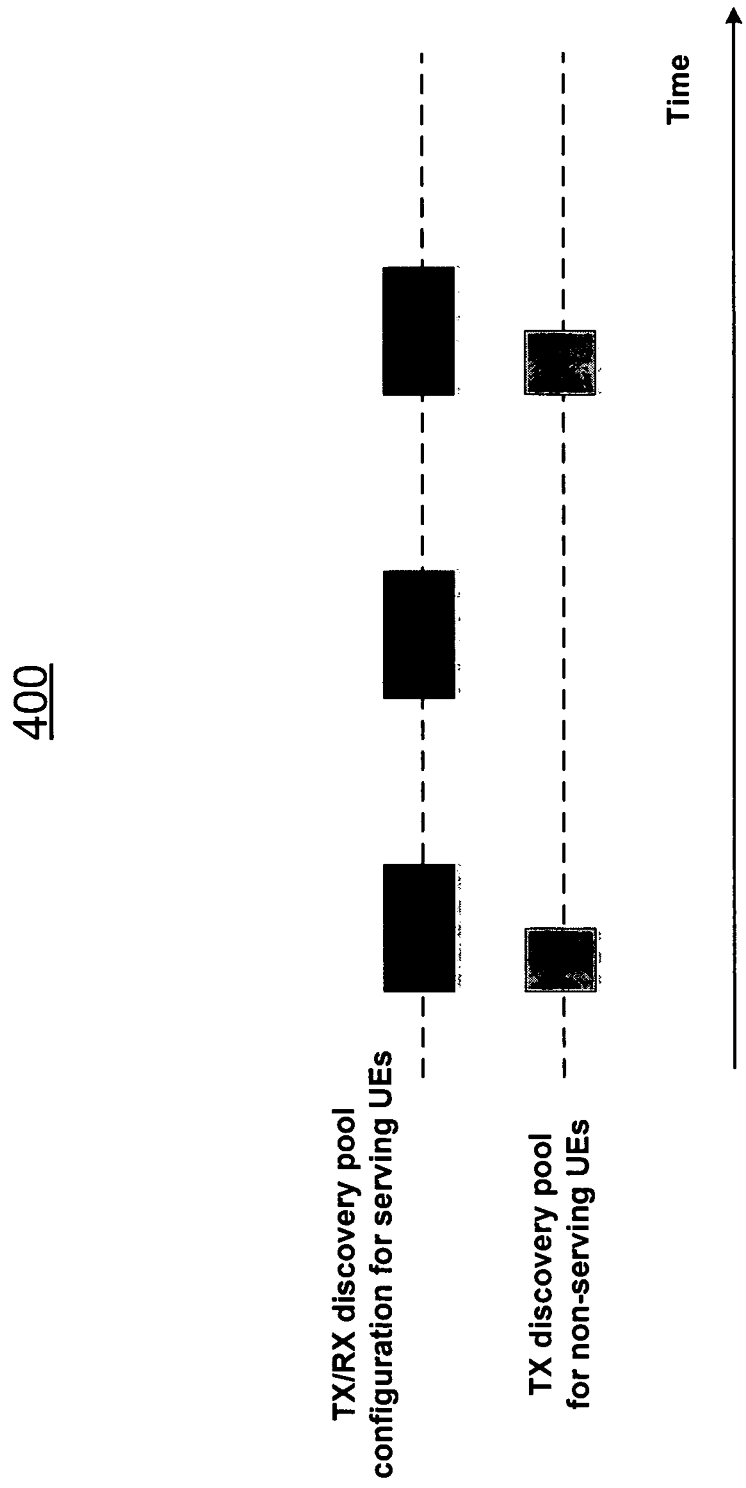
FIG. 4 illustrates a transmission (Tx) resource pool configuration for not-served UEs in accordance with an example.

In one aspect, a dedicated discovery pool (sub-pool) can be configured for inter-frequency/inter-PLMN discovery announcements from not-served UEs (e.g., UEs served by other operators). In one aspect, the discovery transmission pool for the not-served UEs can be only a fraction or one of the TX/RX pools available for served UEs. This could control interference from the announcements of the not-served UEs. The dedicated discovery pool (e.g., sub-pool) configuration can differ by a discovery periodicity (e.g. allocated less frequently), a resource pool configuration subframe bitmap, and/or frequency resource allocation parameters, as illustrated in FIG. 4. FIG. 4 depicts a transmission (Tx) resource pool configuration for not-served UEs (e.g., non-serving UEs).

In one aspect, a sub-pool configuration can be signaled in a dedicated field of a SL-DiscTxPoolList-r12 (e.g., the SL-DiscTxPoolList-r12 specifies a list of the configuration information for an individual pool of resources for sidelink direct discovery) and be decoded by the not-served UEs. The dedicated field can be represented only by a set of parameters that differ from the serving pool configuration for overhead reduction. In one aspect, a same Type 1 discovery resource pool can be configured for the served UEs. However, transmissions from non-served and/or visiting UEs can only be allowed in every "K" period of the Type 1 discovery resource pool configured for served UEs. In one aspect, K is a positive integer and/or a value of 'K' can be indicated in the SIB19 from the non-serving cell. This enables the visiting UEs to monitor discovery message transmissions in other discovery periods for the particular resource pool, i.e., the RX discovery pool for the visiting UEs can be the same as for served UEs. Alternatively, one of the signaled TX pools can be marked as common for the serving and non-serving transmissions by a special flag inside a SL-DiscResourcePool-r12 message container.

Option 3

In one aspect, dedicated power control parameters can be configured for discovery announcements from the not-served UEs. This could also be a possibility to reduce impact of not-served UEs announcements.

Option 4

In one aspect, given that amount of carriers may be rather large (e.g., up to 8 or more carriers according to size of "discInterFreqList"), inter-PLMN discovery announcement intervals and/or periods can be preconfigured on existing discovery pools. The inter-PLMN discovery announcement intervals and/or periods can be associated with a particular carrier and a PLMN identity and/or UE identity. UEs at each carrier can be aware when to expect discovery announcement from the terminals that belong to particular PLMN. The inter-PLMN discovery announcement intervals and/or periods can also control the maxim amount of discovery announcement on each carrier. In an alternatively aspect, the maximum number of discovery announcements for not-served UEs can be configured explicitly for each carrier and PLMN.

Option 5

It should be noted that in 3PGG LTE Rel. 12, discovery DMRS signals do not depend on cell identity. Also, a common sequence, an orthogonal cover code (OCC), and a cyclic shift (CS) can be defined. This results in a same frequency network (SFN) DMRS transmission on a selected discovery resource. Therefore, if two neighbor UEs select a same resource it becomes problematic to discover each of the UEs due to a composite channel estimated using the same DMRS. Thus, the present technology provides an enhanced inter-PLMN solution where the OCC, the CS and the DMRS sequence can be derived using a PLMN identity and/or a virtual cell identity, which may be a function of PLMN and cell identity. In addition, discovery hopping parameters can also be dependent on PLMN identity. The association with PLMN identity will further randomize discovery interference profile and may result in improved performance.

Figure 5:
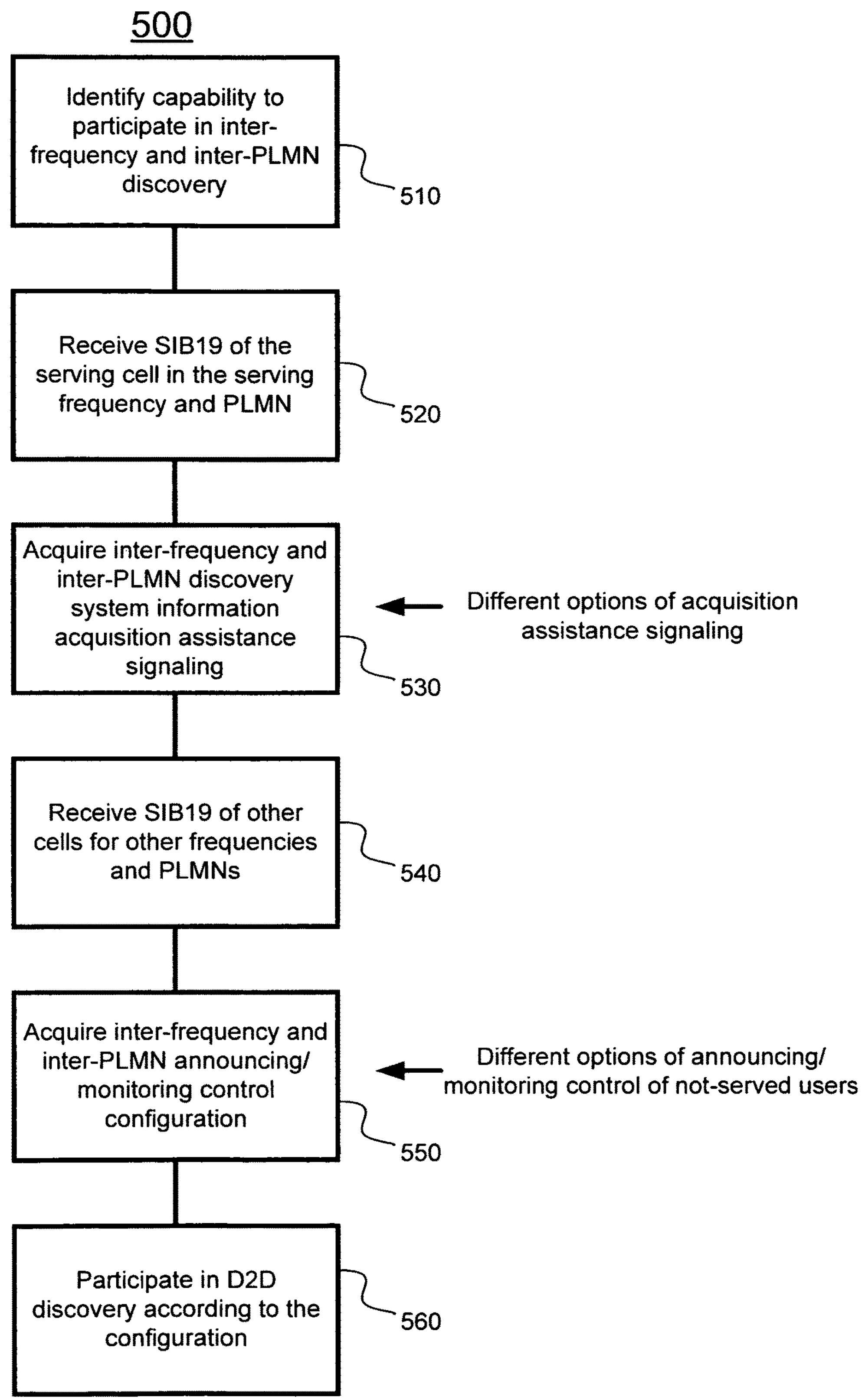
FIG. 5 illustrates an example of performing inter-frequency and inter-public land mobile network (PLMN) discovery for device-to-device (D2D) discovery with one or more UEs in accordance with an example.

FIG. 5 depicts a flow chart 500 for performing, by a user equipment (UE), inter-frequency and inter-public land mobile network (PLMN) discovery for device-to-device (D2D) discovery with one or more UEs. A UE can identify a capability to participate in inter-frequency and inter-PLMN discovery, as in block 510. The UE can receive an SIB19 of the serving cell in the serving frequency and PLMN, as in block 520. The UE can acquire inter-frequency and inter-PLMN discovery system information acquisition assistance signaling, as in block 530. Different options of acquisition assistance signaling can be used in block 530. The UE can receive the SIB19 of other cells for other frequencies and PLMNs, as in block 540. The UE can acquire inter-frequency and inter-PLMN announcing and/or monitoring control configuration, as in block 550. It should be noted that at block 550, different options of announcing and/or monitoring control of not-served users can be used in block 550. The UE can participate in D2D discovery according to the configuration, as in block 560.

Figure 6:
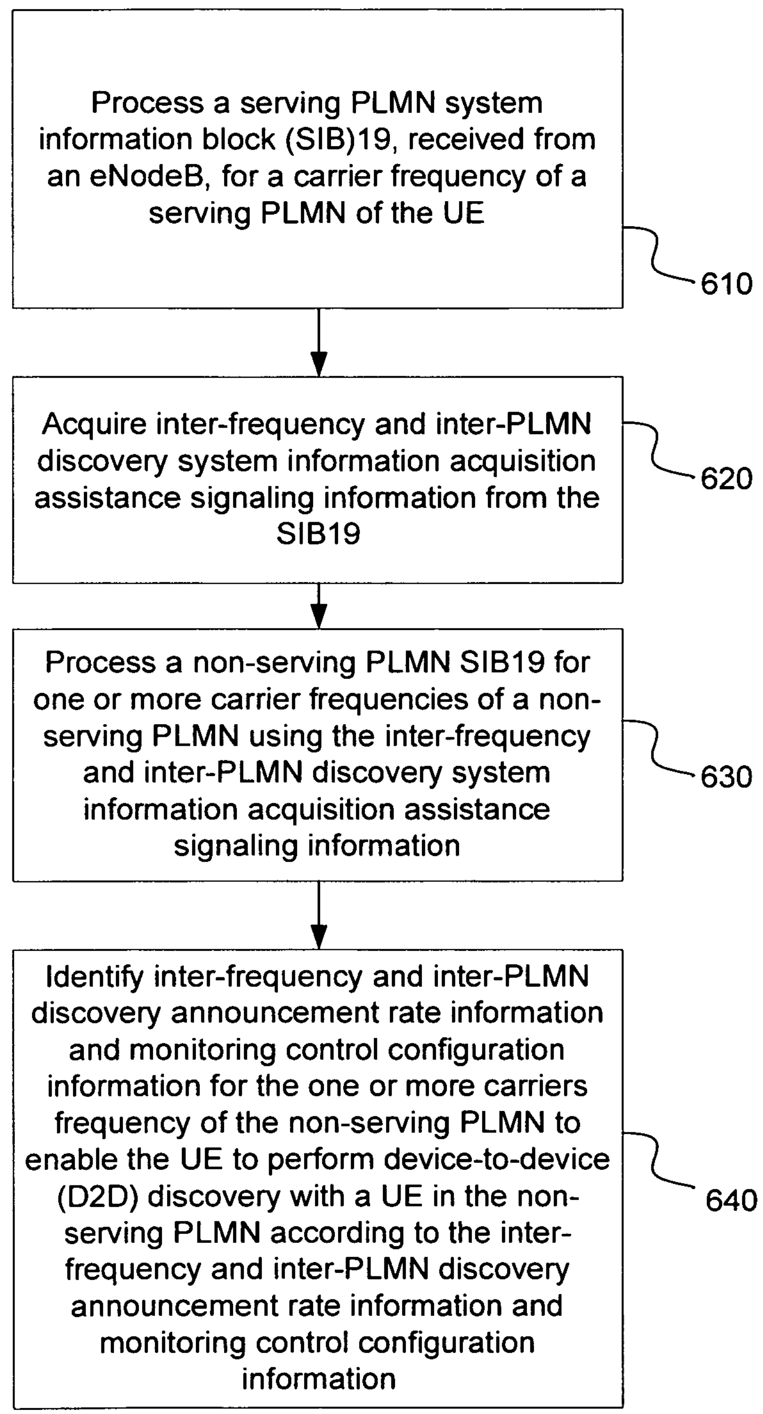
FIG. 6 depicts functionality of a user equipment (UE) operable to perform inter-frequency and inter-public land mobile network (PLMN) discovery for device-to-device (D2D) discovery with one or more UEs in accordance with an example.

FIG. 6 depicts functionality 600 of a user equipment (UE) operable to perform inter-frequency and inter-public land mobile network (PLMN) discovery for device-to-device (D2D) discovery with one or more UEs. The functionality 600 can be implemented as a method or the functionality 600 can be executed as instructions on a machine, where the instructions are included on at least one computer readable medium or one non-transitory machine readable storage medium. One or more processors and memory can be configured to receive, from an eNodeB, a serving PLMN system information block (SIB)19 for a carrier frequency of a serving PLMN of the UE, as in block 610. One or more processors and memory can be configured to acquire inter-frequency and inter-PLMN discovery system information acquisition assistance signaling information from the SIB19, as in block 620. One or more processors and memory can be configured to process a non-serving PLMN SIB19 for one or more carrier frequencies of a non-serving PLMN using the inter-frequency and inter-PLMN discovery system information acquisition assistance signaling information, as in block 630. One or more processors and memory can be configured to identify inter-frequency and inter-PLMN discovery announcement rate information and monitoring control configuration information for the one or more carriers frequency of the non-serving PLMN to enable the UE to perform device-to-device (D2D) discovery with a UE in the non-serving PLMN according to the inter-frequency and inter-PLMN discovery announcement rate information and monitoring control configuration information, as in block 640.

Figure 7:
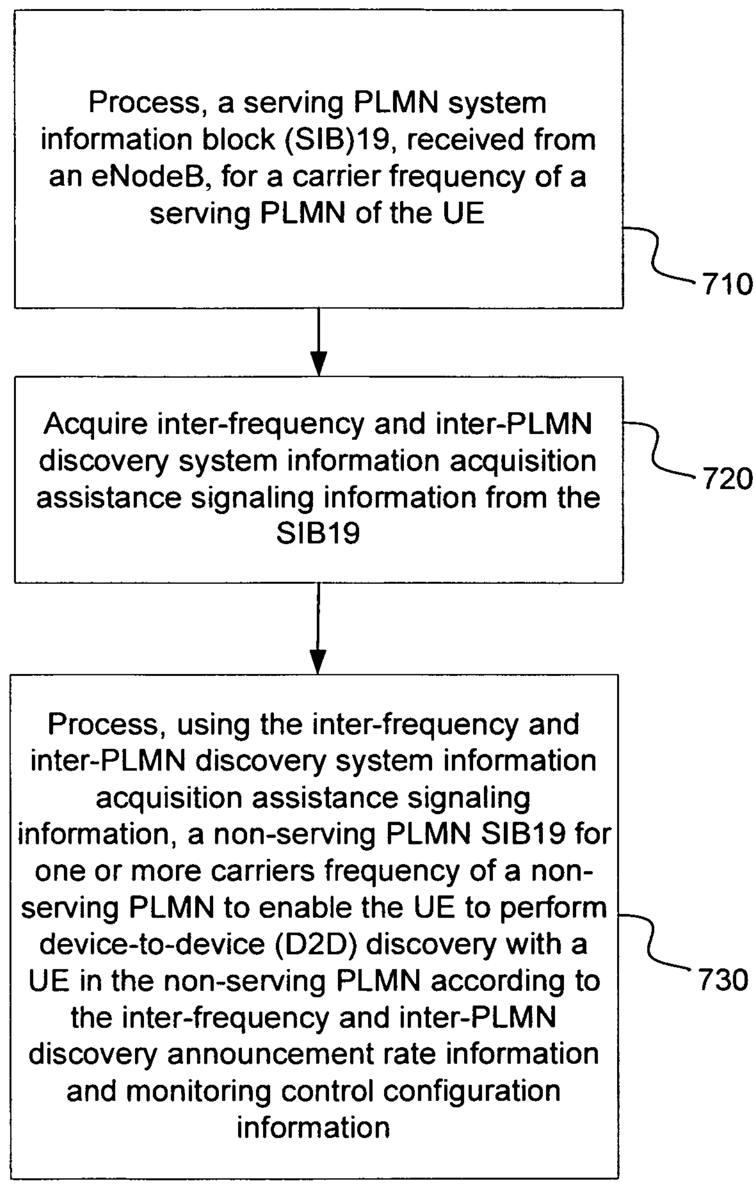
FIG. 7 depicts additional functionality of a user equipment (UE) operable to perform inter-frequency and inter-public land mobile network (PLMN) discovery for device-to-device (D2D) discovery with one or more UEs in accordance with an example.

FIG. 7 depicts additional functionality 700 of a user equipment (UE) operable to perform inter-frequency and inter-public land mobile network (PLMN) discovery for device-to-device (D2D) discovery with one or more UEs in accordance with an example. The functionality 700 can be implemented as a method or the functionality 700 can be executed as instructions on a machine, where the instructions are included on at least one computer readable medium or one non-transitory machine readable storage medium. One or more processors and memory can be configured to receive, from an eNodeB, a serving PLMN system information block (SIB)19 for a carrier frequency of a serving PLMN of the UE, as in block 710. One or more processors and memory can be configured to acquire and/or identify inter-frequency and inter-PLMN discovery system information acquisition assistance signaling information from the SIB19, as in block 720. One or more processors and memory can be configured to process, using the inter-frequency and inter-PLMN discovery system information acquisition assistance signaling information, a non-serving PLMN SIB19 for one or more carriers frequency of a non-serving PLMN to enable the UE to perform device-to-device (D2D) discovery with a UE in the non-serving PLMN according to the inter-frequency and inter-PLMN discovery announcement rate information and monitoring control configuration information, as in block 730.

Figure 8:
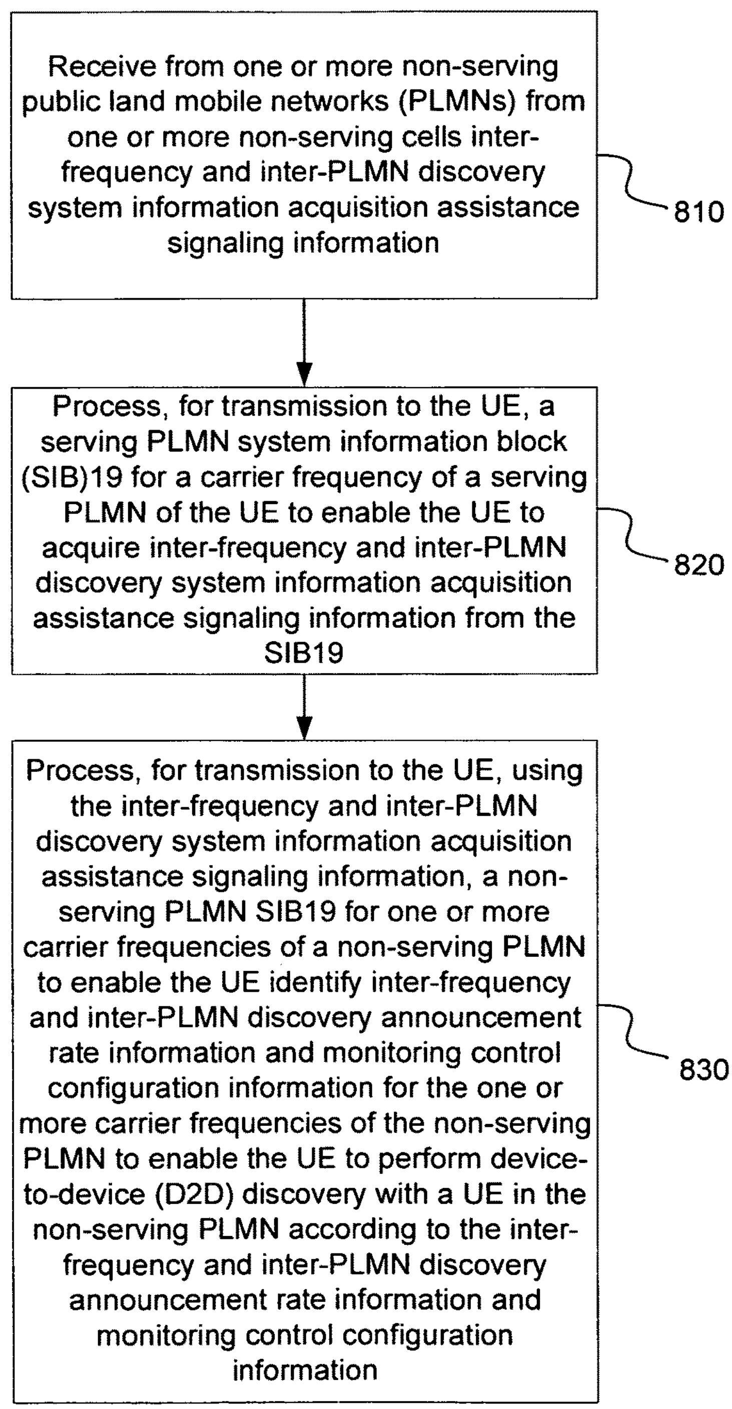
FIG. 8 depicts additional functionality of an eNodeB operable to assist a user equipment (UE) to perform inter-frequency and inter-public land mobile network (PLMN) discovery for device-to-device (D2D) discovery with one or more in accordance with an example.

FIG. 8 depicts additional functionality of an eNodeB operable to assist a user equipment (UE) to perform inter-frequency and inter-public land mobile network (PLMN) discovery for device-to-device (D2D) discovery with one or more in accordance with an example. The functionality 800 can be implemented as a method or the functionality 800 can be executed as instructions on a machine, where the instructions are included on at least one computer readable medium or one non-transitory machine readable storage medium. One or more processors and memory can be configured to process the inter-frequency and inter-PLMN discovery system information acquisition assistance signaling information received from one or more non-serving PLMNs or from one or more non-serving cells, as in block 810. One or more processors and memory can be configured to process, for transmission to the UE, a serving PLMN system information block (SIB)19 for a carrier frequency of a serving PLMN of the UE to enable the UE to acquire inter-frequency and inter-PLMN discovery system information acquisition assistance signaling information from the SIB19, as in block 820. One or more processors and memory can be configured to process, for transmission to the UE, using the inter-frequency and inter-PLMN discovery system information acquisition assistance signaling information, a non-serving PLMN SIB19 for one or more carrier frequencies of a non-serving PLMN to enable the UE identify inter-frequency and inter-PLMN discovery announcement rate information and monitoring control configuration information for the one or more carriers frequency of the non-serving PLMN to enable the UE to perform device-to-device (D2D) discovery with a UE in the non-serving PLMN according to the inter-frequency and inter-PLMN discovery announcement rate information and monitoring control configuration information, as in block 830.

Figure 9:
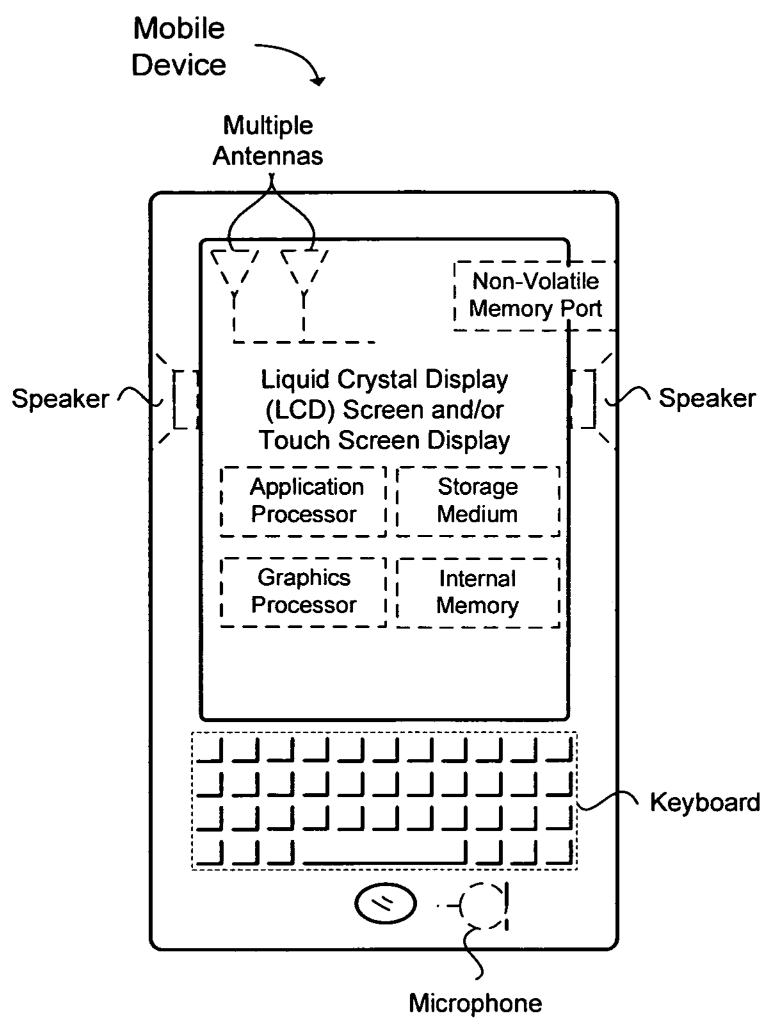
FIG. 9 illustrates a diagram of a wireless device (e.g., UE) in accordance with an example.

FIG. 9 provides an example illustration of the wireless device, such as a user equipment (UE), a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, a baseband processor, an application processor, internal memory, a non-volatile memory port, and combinations thereof.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The mobile device can include a storage medium. In one aspect, the storage medium can be associated with and/or communication with the application processor, the graphics processor, the display, the non-volatile memory port, and/or internal memory. In one aspect, the application processor and graphics processor are storage mediums.

Figure 10:
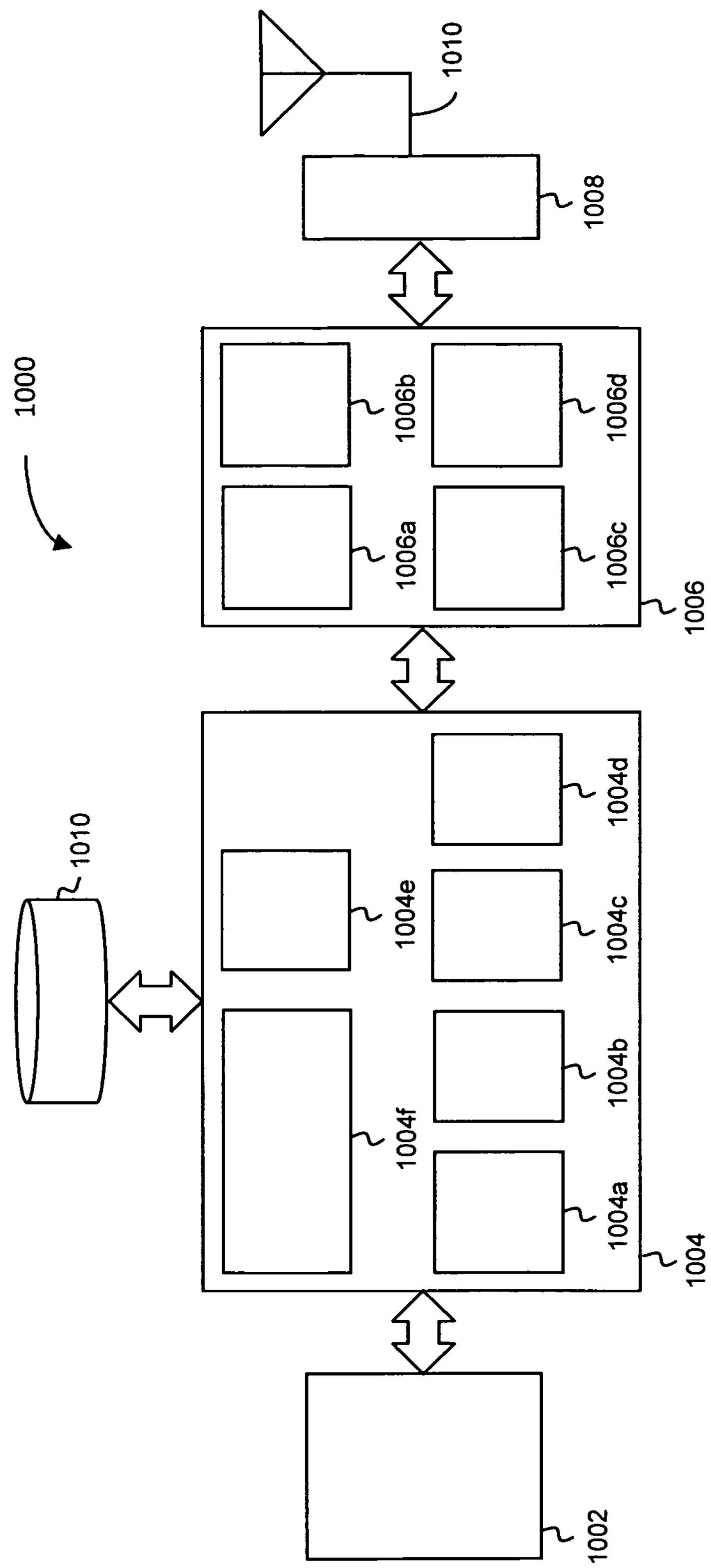
FIG. 10 illustrates a diagram of example components of a User Equipment (UE) device in accordance with an example.

FIG. 10 illustrates, for one aspect, example components of a User Equipment (UE) device 1000. In some aspects, the UE device 1000 can include application circuitry 1002, baseband circuitry 1004, Radio Frequency (RF) circuitry 1006, front-end module (FEM) circuitry 1008 and one or more antennas 1010, coupled together at least as shown.

The application circuitry 1002 can include one or more application processors. For example, the application circuitry 1002 can include circuitry such as, but not limited to, one or more single-core or multi-core processors. The processor(s) can include any combination of general-purpose processors and dedicated processors (e.g., graphics processors, application processors, etc.). The processors can be coupled with and/or can include a storage medium 1012, and can be configured to execute instructions stored in the storage medium 1012 to enable various applications and/or operating systems to run on the system.

The baseband circuitry 1004 can include circuitry such as, but not limited to, one or more single-core or multi-core processors. The baseband circuitry 1004 can include one or more baseband processors and/or control logic to process baseband signals received from a receive signal path of the RF circuitry 1006 and to generate baseband signals for a transmit signal path of the RF circuitry 1006. Baseband processing circuitry 1004 can interface with the application circuitry 1002 for generation and processing of the baseband signals and for controlling operations of the RF circuitry

1006. For example, in some aspects, the baseband circuitry 1004 can include a second generation (2G) baseband processor 1004*a,* third generation (3G) baseband processor 1004*b,* fourth generation (4G) baseband processor 1004*c,* and/or other baseband processor(s) 1004*d* for other existing generations, generations in development or to be developed in the future (e.g., fifth generation (5G), 6G, etc.). The baseband circuitry 1004 (e.g., one or more of baseband processors 1004*a-d*) can handle various radio control functions that enable communication with one or more radio networks via the RF circuitry 1006. The radio control functions can include, but are not limited to, signal modulation/demodulation, encoding/decoding, radio frequency shifting, etc. In some aspects, modulation/demodulation circuitry of the baseband circuitry 1004 can include Fast-Fourier Transform (FFT), preceding, and/or constellation mapping/demapping functionality. In some aspects, encoding/decoding circuitry of the baseband circuitry 1004 can include convolution, tail-biting convolution, turbo, Viterbi, and/or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1004 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1004*e* of the baseband circuitry 1004 can be configured to run elements of the protocol stack for signaling of the PHY, MAC, RLC, PDCP and/or RRC layers. In some aspects, the baseband circuitry can include one or more audio digital signal processor(s) (DSP) 1004*f.* The audio DSP(s) 1004*f* can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1004 and the application circuitry 1002 can be implemented together such as, for example, on a system on a chip (SOC).

In some aspects, the baseband circuitry 1004 can provide for communication compatible with one or more radio technologies. For example, in some aspects, the baseband circuitry 1004 can support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 1004 is configured to support radio communications of more than one wireless protocol can be referred to as multi-mode baseband circuitry.

RF circuitry 1006 can enable communication with wireless networks using modulated electromagnetic radiation through a non-solid medium. In various aspects, the RF circuitry 1006 can include switches, filters, amplifiers, etc. to facilitate the communication with the wireless network. RF circuitry 1006 can include a receive signal path which can include circuitry to down-convert RF signals received from the FEM circuitry 1008 and provide baseband signals to the baseband circuitry 1004. RF circuitry 1006 can also include a transmit signal path which can include circuitry to up-convert baseband signals provided by the baseband circuitry 1004 and provide RF output signals to the FEM circuitry 1008 for transmission.

In some aspects, the RF circuitry 1006 can include a receive signal path and a transmit signal path. The receive signal path of the RF circuitry 1006 can include mixer circuitry 1006*a,* amplifier circuitry 1006*b* and filter circuitry 1006*c.* The transmit signal path of the RF circuitry 1006 can include filter circuitry 1006*c* and mixer circuitry 1006*a.* RF circuitry 1006 can also include synthesizer circuitry 1006*d* for synthesizing a frequency for use by the mixer circuitry 1006*a* of the receive signal path and the transmit signal path. In some aspects, the mixer circuitry 1006*a* of the receive signal path can be configured to down-convert RF signals received from the FEM circuitry 1008 based on the synthesized frequency provided by synthesizer circuitry 1006*d.* The amplifier circuitry 1006*b* can be configured to amplify the down-converted signals and the filter circuitry 1006*c* can be a low-pass filter (LPF) or band-pass filter (BPF) configured to remove unwanted signals from the down-converted signals to generate output baseband signals. Output baseband signals can be provided to the baseband circuitry 1004 for further processing. In some aspects, the output baseband signals can be zero-frequency baseband signals, although this is not a mandate. In some aspects, mixer circuitry 1006*a* of the receive signal path can comprise passive mixers, although the scope of the aspects is not limited in this respect.

In some aspects, the mixer circuitry 1006*a* of the transmit signal path can be configured to up-convert input baseband signals based on the synthesized frequency provided by the synthesizer circuitry 1006*d* to generate RF output signals for the FEM circuitry 1008. The baseband signals can be provided by the baseband circuitry 1004 and can be filtered by filter circuitry 1006*c.* The filter circuitry 1006*c* can include a low-pass filter (LPF), although the scope of the aspects is not limited in this respect.

In some aspects, the mixer circuitry 1006*a* of the receive signal path and the mixer circuitry 1006*a* of the transmit signal path can include two or more mixers and can be arranged for quadrature down conversion and/or up conversion respectively. In some aspects, the mixer circuitry 1006*a* of the receive signal path and the mixer circuitry 1006a of the transmit signal path can include two or more mixers and can be arranged for image rejection (e.g., Hartley image rejection). In some aspects, the mixer circuitry 1006*a* of the receive signal path and the mixer circuitry 1006*a* can be arranged for direct down conversion and/or direct up conversion, respectively. In some aspects, the mixer circuitry 1006*a* of the receive signal path and the mixer circuitry 1006*a* of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1006 can include analog-to-digital converter (ADC) and digital-to-analog converter (DAC) circuitry and the baseband circuitry 1004 can include a digital baseband interface to communicate with the RF circuitry 1006.

In some dual-mode embodiments, a separate radio IC circuitry can be provided for processing signals for each spectrum, although the scope of the embodiments is not limited in this respect.

In some embodiments, the synthesizer circuitry **1006*d* can be a fractional-N synthesizer or a fractional N/N+1 synthesizer, although the scope of the embodiments is not limited in this respect as other types of frequency synthesizers can be suitable. For example, synthesizer circuitry 1006*d*** can be a delta-sigma synthesizer, a frequency multiplier, or a synthesizer comprising a phase-locked loop with a frequency divider.

The synthesizer circuitry **1006*d* can be configured to synthesize an output frequency for use by the mixer circuitry 1006*a* of the RF circuitry 1006 based on a frequency input and a divider control input. In some embodiments, the synthesizer circuitry 1006*d*** can be a fractional N/N+1 synthesizer.

In some embodiments, frequency input can be provided by a voltage controlled oscillator (VCO), although that is not a mandate. Divider control input can be provided by either the baseband circuitry 1004 or the applications processor 1002 depending on the desired output frequency. In some embodiments, a divider control input (e.g., N) can be determined from a look-up table based on a channel indicated by the applications processor 1002.

Synthesizer circuitry **1006*d* of the RF circuitry 1006** can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry **1006*d* can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 1006** can include an IQ/polar converter.

FEM circuitry 1008 can include a receive signal path which can include circuitry configured to operate on RF signals received from one or more antennas 1010, amplify the received signals and provide the amplified versions of the received signals to the RF circuitry 1006 for further processing. FEM circuitry 1008 can also include a transmit signal path which can include circuitry configured to amplify signals for transmission provided by the RF circuitry 1006 for transmission by one or more of the one or more antennas 1010.

In some embodiments, the FEM circuitry 1008 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 1006). The transmit signal path of the FEM circuitry 1008 can include a power amplifier (PA) to amplify input RF signals (e.g., provided by RF circuitry 1006), and one or more filters to generate RF signals for subsequent transmission (e.g., by one or more of the one or more antennas 1010.

In some embodiments, the UE device 1800 can include additional elements such as, for example, memory/storage, display, camera, sensor, and/or input/output (I/O) interface.

Figure 11:
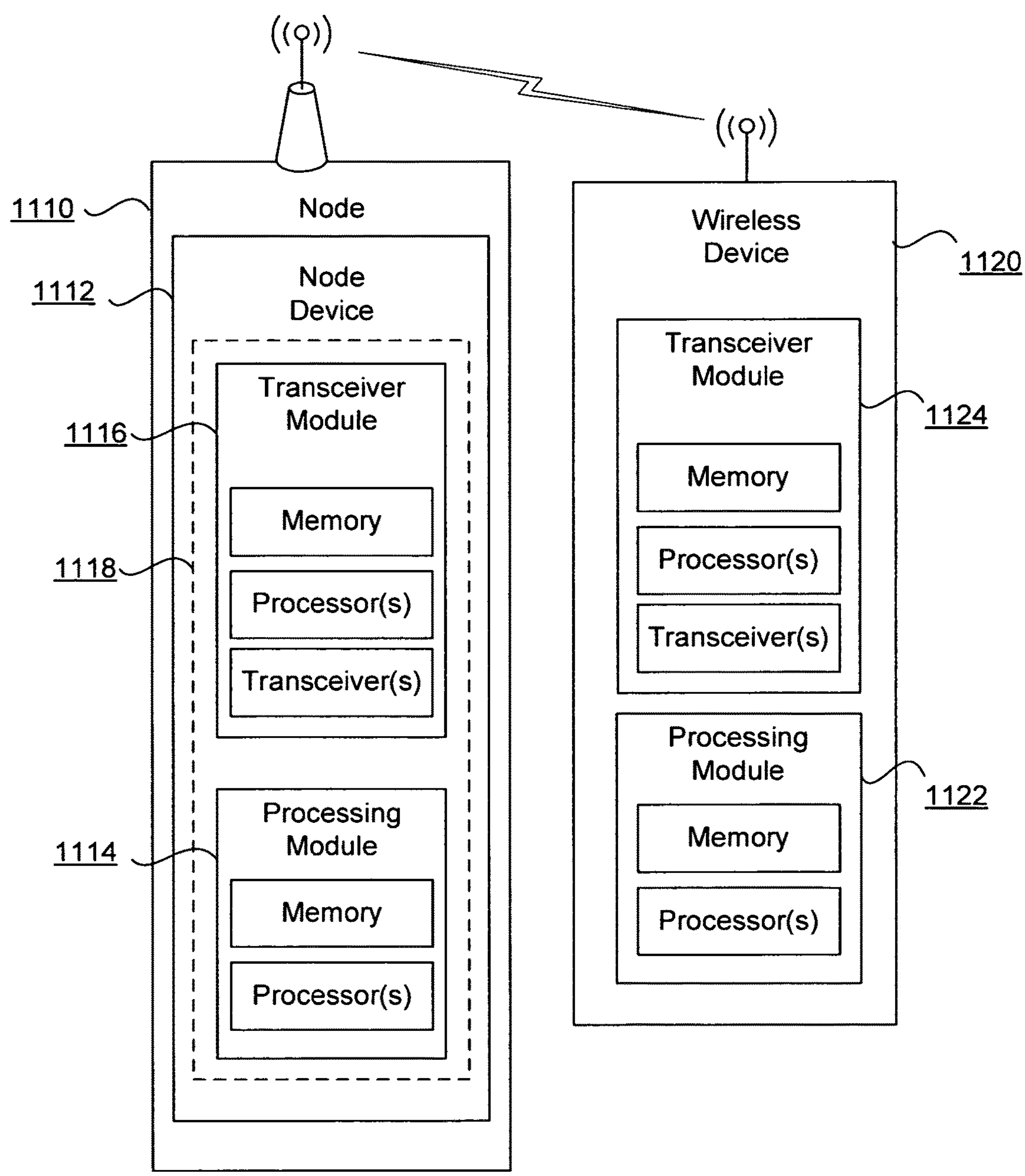
FIG. 11 illustrates a diagram of a node (e.g., eNB) and wireless device (e.g., UE) in accordance with an example.

FIG. 11 illustrates a diagram 1100 of a node 1110 (e.g., eNB and/or a Serving GPRS Support Node) and wireless device (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 1110 can include a node device 1112. The node device 1112 or the node 1110 can be configured to communicate with the wireless device 1120. The node device 1112 can be configured to implement the technology described. The node device 1112 can include a processing module 1114 and a transceiver module 1116. In one aspect, the node device 1112 can include the transceiver module 1116 and the processing module 1114 forming a circuitry 1118 for the node 1110. In one aspect, the transceiver module 1116 and the processing module 1114 can form a circuitry of the node device 1112. The processing module 1114 can include one or more processors and memory. In one embodiment, the processing module 1122 can include one or more application processors. The transceiver module 1116 can include a transceiver and one or more processors and memory. In one embodiment, the transceiver module 1116 can include a baseband processor.

The wireless device 1120 can include a transceiver module 1124 and a processing module 1122. The processing module 1122 can include one or more processors and memory. In one embodiment, the processing module 1122 can include one or more application processors. The transceiver module 1124 can include a transceiver and one or more processors and memory. In one embodiment, the transceiver module 1124 can include a baseband processor. The wireless device 1120 can be configured to implement the technology described. The node 1110 and the wireless devices 1120 can also include one or more storage mediums, such as the transceiver module 1116, 1124 and/or the processing module 1114, 1122.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

EXAMPLES

The following examples pertain to specific technology embodiments and point out specific features, elements, or steps that can be used or otherwise combined in achieving such embodiments.

Example 1 includes an apparatus of a user equipment (UE), the UE configured to perform inter-frequency and inter-public land mobile network (PLMN) discovery, the apparatus comprising one or more processors and memory configured to: process a serving PLMN system information block (SIB)19, received from an eNodeB, for a carrier frequency of a serving PLMN of the UE; acquire inter-frequency and inter-PLMN discovery system information acquisition assistance signaling information from the SIB19; process a non-serving PLMN SIB19 for one or more carrier frequencies of a non-serving PLMN using the inter-frequency and inter-PLMN discovery system information acquisition assistance signaling information; and identify inter-frequency and inter-PLMN discovery announcement rate information and monitoring control configuration information for the one or more carrier frequencies of the non-serving PLMN to enable the UE to perform device-to-device (D2D) discovery with a UE in the non-serving PLMN according to the inter-frequency and inter-PLMN discovery announcement rate information and monitoring control configuration information.

Example 2 includes the apparatus of example 1, wherein the inter-frequency and inter-PLMN discovery system information acquisition assistance signaling information includes inter-frequency scheduling information that includes carrier bandwidth, power information, system information radio network temporary identifier (SI-RNTI), SIB1 scheduling information, and SIB19 scheduling information.

Example 3 includes the apparatus of example 1 or 2, wherein the inter-frequency and inter-PLMN discovery system information acquisition assistance signaling information includes information regarding a time window for inter-frequency and inter-PLMN discovery.

Example 4 includes the apparatus of example 1, wherein the one or more processors and memory are further configured to indicate acquisition assistance signaling after receiving from the inter-frequency and inter-PLMN discovery system information acquisition assistance signaling information that includes bandwidth, power, system information radio network temporary identifier (SI-RNTI), SIB1 scheduling information, and SIB19 scheduling information or the information regarding a time window for inter-frequency and inter-PLMN discovery.

Example 5 includes the apparatus of example 1 or 4, wherein the inter-frequency and inter-PLMN discovery announcement rate information and monitoring control configuration information provides full discovery configuration information for intra-PLMN discovery announcement or monitoring comprising of a higher layer signaling of resource pool configuration for a plurality of cell frequencies served by the serving PLMN, and a higher layer signaling of SIB19 scheduling information of the one or more carrier frequencies of the non-serving PLMN.

Example 6 includes the apparatus of example 1 or 4, wherein the inter-frequency and inter-PLMN discovery announcement rate information and monitoring control configuration information provides full discovery configuration information for inter-PLMN discovery announcement or monitoring comprising across a plurality of cell frequencies comprising of higher layer signaling of a resource pool configuration for a plurality of cell frequencies served by the serving PLMN, and higher layer signaling of a time window relative to the serving cell frequency to acquire an SIB19 transmitted at different cell frequencies relative to the serving cell, and higher layer signaling to indicate a change of the inter-frequency and inter-PLMN discovery announcement rate information and monitoring control configuration information on one a plurality of inter-frequency within a broadcasted inter-frequency list X2 signaling to exchange information about the inter-frequency and inter-PLMN discovery announcement rate information and monitoring control configuration information for a plurality of PLMNs.

Example 7 includes the apparatus of example 6, wherein the one or more processors and memory are further configured to: use the inter-frequency and inter-PLMN discovery announcement rate information and monitoring control configuration information for a list of non-serving cells that are geographically proximal to a serving cell of the serving PLMN for each cell carrier frequency of a one or more non-serving PLMNs and indexed by a PLMN identification (ID) and Physical Cell IDs (PCIDs); and use a higher layer signaling of transmission probabilities for the inter-frequency and inter-PLMN discovery announcement rate information and monitoring control configuration information, wherein the higher layer signaling configures: an announcement rate for the UE in an SIB19 of particular pool in a serving cell frequency controlled by the serving PLMN; an inter-PLMN discovery announcement rate information in a frequency list of SIB19 of the serving cell frequency; or a dedicated discovery pool or a sub-pool for inter-frequency and inter-PLMN discovery.

Example 8 includes the apparatus of example 1 or 7, wherein the higher layer signaling configures: a transmission (TX) discovery pool for transmission of discovery messages on the one or more carrier frequencies of the non-serving PLMN such that the UE transmits on every K-th period of the discovery pool configured in the one of a plurality of carrier frequencies, where K is a positive integer greater than 1; a time interval for inter-frequency discovery announcement or monitoring on top of an existing discovery pool configurations, wherein the time interval is dependent on a PLMN identity; use a configuration of transmission probabilities, a discovery announcement rate, a dedicated discovery pool, and a time period for inter-frequency discovery announcement as a function of a PLMN identity; perform inter-PLMN discovery announcement and monitoring using PLMN identity dependent scheduling for discovery announcement across a plurality of carrier frequencies; perform inter-PLMN discovery announcement and monitoring using randomization of discovery announcement and discovery monitoring intervals based on one or more of a plurality of different identities; or use a physical structure of a discovery signaling comprising a demodulation reference signals (DMRS) sequence, a DMRS orthogonal cover code sequence, DMRS cyclic shift, a discovery hopping within discovery pool, a discovery signal physical structure that is a function of a PLMN identity, or a combination thereof.

Example 9 includes the apparatus of example 1, wherein the apparatus includes at least one of an antenna, a touch sensitive display screen, a speaker, a microphone, a graphics processor, an application processor, internal memory, a non-volatile memory port, and combinations thereof.

Example 10 includes an apparatus of a user equipment (UE), the UE configured to perform inter-frequency and inter-public land mobile network (PLMN) discovery, the apparatus comprising one or more processors and memory configured to: process, a serving PLMN system information block (SIB)19, received from an eNodeB, for a carrier frequency of a serving PLMN of the UE; acquire inter-frequency and inter-PLMN discovery system information acquisition assistance signaling information from the SIB19; and process, using the inter-frequency and inter-PLMN discovery system information acquisition assistance signaling information, a non-serving PLMN SIB19 for one or more carriers frequency of a non-serving PLMN to enable the UE to perform device-to-device (D2D) discovery with a UE in the non-serving PLMN according to the inter-frequency and inter-PLMN discovery announcement rate information and monitoring control configuration information.

Example 11 includes the apparatus of example 10, wherein the one or more processors and memory are further configured to identify inter-frequency and inter-PLMN discovery announcement rate information and monitoring control configuration information for the one or more carrier's frequency of the non-serving PLMN.

Example 12 includes the apparatus of example 10 or 11, wherein the inter-frequency and inter-PLMN discovery system information acquisition assistance signaling information includes inter-frequency scheduling information that includes carrier bandwidth, power control information, system information radio network temporary identifier (SI-RNTI), SIB1 scheduling information, and SIB19 scheduling information.

Example 13 includes the apparatus of example 10, wherein the inter-frequency and inter-PLMN discovery system information acquisition assistance signaling information includes information regarding a time window for inter-frequency and inter-PLMN discovery.

Example 14 includes the apparatus of example 10 or 13, wherein the one or more processors and memory are further configured to indicate acquisition assistance signaling after receiving from the inter-frequency and inter-PLMN discovery system information acquisition assistance signaling information that includes bandwidth, power control information, system information radio network temporary identifier (SI-RNTI), SIB1 scheduling information, and SIB19 scheduling information or the information regarding a time window for inter-frequency and inter-PLMN discovery.

Example 15 includes the apparatus of example 14, wherein the inter-frequency and inter-PLMN discovery system information acquisition assistance signaling information provides full discovery configuration information for intra-PLMN discovery announcement or monitoring comprising of a higher layer signaling of resource pool configuration for a plurality of cell frequencies served by the serving PLMN, and a higher layer signaling of SIB19 scheduling information of the one or more carrier frequencies of the non-serving PLMN.

Example 16 includes the apparatus of example 10 or 15, wherein inter-frequency and inter-PLMN discovery system information acquisition assistance signaling information provides full discovery configuration information for inter-PLMN discovery announcement or monitoring comprising across a plurality of cell frequencies comprising of higher layer signaling of a resource pool configuration for a plurality of cell frequencies served by the serving PLMN, and higher layer signaling of a time window relative to the serving cell frequency to acquire an SIB19 transmitted at different cell frequencies relative to the serving cell, and higher layer signaling to indicate a change of the inter-frequency and inter-PLMN discovery announcement rate information and monitoring control configuration information on one a plurality of inter-frequency within a broadcasted inter-frequency list X2 signaling to exchange information about the inter-frequency and inter-PLMN discovery announcement rate information and monitoring control configuration information for a plurality of PLMNs.

Example 17 includes the apparatus of example 10, wherein the one or more processors and memory are further configured to use the inter-frequency and inter-PLMN discovery announcement rate information and monitoring control configuration information for a list of non-serving cells that are geographically proximal to a serving cell of the serving PLMN for each cell carrier frequency of a one or more non-serving PLMNs and indexed by a PLMN identification (ID) and Physical Cell IDs (PCIDs).

Example 18 includes the apparatus of example 10 or 17, wherein the one or more processors and memory are further configured to use a higher layer signaling of transmission probabilities for the inter-frequency and inter-PLMN discovery announcement rate information and monitoring control configuration information, wherein the higher layer signaling configures: an announcement rate for the UE in an SIB19 of particular pool in a serving cell frequency controlled by the serving PLMN; an inter-PLMN discovery announcement rate information in a frequency list of SIB19 of the serving cell frequency; or a dedicated discovery pool or a sub-pool for inter-frequency and inter-PLMN discovery.

Example 19 includes the apparatus of example 18, wherein the higher layer signaling configures: a transmission (TX) discovery pool for transmission of discovery messages on the one or more carrier frequencies of the non-serving PLMN such that the UE transmits on every K-th period of the discovery pool configured in the one of a plurality of carrier frequencies, where K is a positive integer greater than 1; or a time interval for inter-frequency discovery announcement or monitoring on top of an existing discovery pool configurations, wherein the time interval is dependent on a PLMN identity.

Example 20 includes the apparatus of example 10 or 19, wherein the one or more processors and memory are further configured to use a configuration of transmission probabilities, a discovery announcement rate, a dedicated discovery pool, and a time period for inter-frequency discovery announcement as a function of a PLMN identity.

Example 21 includes the apparatus of example 10, wherein the one or more processors and memory are further configured to: perform inter-PLMN discovery announcement and monitoring using PLMN identity dependent scheduling for discovery announcement across a plurality of carrier frequencies; perform inter-PLMN discovery announcement and monitoring using randomization of discovery announcement and discovery monitoring intervals based on one or more of a plurality of different identities; or use a physical structure of a discovery signaling comprising a demodulation reference signals (DMRS) sequence, a DMRS orthogonal cover code sequence, DMRS cyclic shift, a discovery hopping within discovery pool, a discovery signal physical structure that is a function of a PLMN identity, or a combination thereof.

Example 22 includes an apparatus of an eNodeB, the eNodeB configured to a assist an user equipment (UE) to perform inter-frequency and inter-public land mobile network (PLMN) discovery, the apparatus comprising one or more processors and memory configured to: process, for transmission to the UE, a serving PLMN system information block (SIB)19 for a carrier frequency of a serving PLMN of the UE to enable the UE to acquire inter-frequency and inter-PLMN discovery system information acquisition assistance signaling information from the SIB19; and process, for transmission to the UE, using the inter-frequency and inter-PLMN discovery system information acquisition assistance signaling information, a non-serving PLMN SIB19 for one or more carrier frequencies of a non-serving PLMN to enable the UE identify inter-frequency and inter-PLMN discovery announcement rate information and monitoring control configuration information for the one or more carrier frequencies of the non-serving PLMN to enable the UE to perform device-to-device (D2D) discovery with a UE in the non-serving PLMN according to the inter-frequency and inter-PLMN discovery announcement rate information and monitoring control configuration information.

Example 23 includes the apparatus of example 22, wherein the one or more processors and memory are further configured to: process the inter-frequency and inter-PLMN discovery system information acquisition assistance signaling information received from one or more non-serving PLMNs or from one or more non-serving cells.

Example 24 includes the apparatus of example 22, wherein the inter-frequency and inter-PLMN discovery system information acquisition assistance signaling information enables the UE to perform device-to-device (D2D) discovery with a UE in the non-serving PLMN according to the inter-frequency and inter-PLMN discovery announcement rate information and monitoring control configuration information.

Example 25 includes an apparatus of a user equipment (UE), the UE configured to perform inter-frequency and inter-public land mobile network (PLMN) discovery, the apparatus comprising one or more processors and memory configured to: receive, from an eNodeB, a serving PLMN system information block (SIB)19 for a carrier frequency of a serving PLMN of the UE; acquire inter-frequency and inter-PLMN discovery system information acquisition assistance signaling information from the SIB19; process a non-serving PLMN SIB19 for one or more carrier frequencies of a non-serving PLMN using the inter-frequency and inter-PLMN discovery system information acquisition assistance signaling information; and identify inter-frequency and inter-PLMN discovery announcement rate information and monitoring control configuration information for the one or more carrier frequencies of the non-serving PLMN to enable the UE to perform device-to-device (D2D) discovery with a UE in the non-serving PLMN according to the inter-frequency and inter-PLMN discovery announcement rate information and monitoring control configuration information.

Example 26 includes the apparatus of example 25, wherein the inter-frequency and inter-PLMN discovery system information acquisition assistance signaling information includes inter-frequency scheduling information that includes carrier bandwidth, power information, system information radio network temporary identifier (SI-RNTI), SIB1 scheduling information, and SIB19 scheduling information.

Example 27 includes the apparatus of example 25, wherein the inter-frequency and inter-PLMN discovery system information acquisition assistance signaling information includes information regarding a time window for inter-frequency and inter-PLMN discovery.

Example 28 includes the apparatus of example 25, wherein the one or more processors and memory are further configured to indicate acquisition assistance signaling after receiving from the inter-frequency and inter-PLMN discovery system information acquisition assistance signaling information that includes bandwidth, power, system information radio network temporary identifier (SI-RNTI), SIB1 scheduling information, and SIB19 scheduling information or the information regarding a time window for inter-frequency and inter-PLMN discovery.

Example 29 includes the apparatus of example 25, wherein the inter-frequency and inter-PLMN discovery announcement rate information and monitoring control configuration information provides full discovery configuration information for intra-PLMN discovery announcement or monitoring comprising of a higher layer signaling of resource pool configuration for a plurality of cell frequencies served by the serving PLMN, and a higher layer signaling of SIB19 scheduling information of the one or more carrier frequencies of the non-serving PLMN.

Example 30 includes the apparatus of example 25, wherein the inter-frequency and inter-PLMN discovery announcement rate information and monitoring control configuration information provides full discovery configuration information for inter-PLMN discovery announcement or monitoring comprising across a plurality of cell frequencies comprising of higher layer signaling of a resource pool configuration for a plurality of cell frequencies served by the serving PLMN, and higher layer signaling of a time window relative to the serving cell frequency to acquire an SIB19 transmitted at different cell frequencies relative to the serving cell, and higher layer signaling to indicate a change of the inter-frequency and inter-PLMN discovery announcement rate information and monitoring control configuration information on one a plurality of inter-frequency within a broadcasted inter-frequency list X2 signaling to exchange information about the inter-frequency and inter-PLMN discovery announcement rate information and monitoring control configuration information for a plurality of PLMNs.

Example 31 includes the apparatus of example 30, wherein the one or more processors and memory are further configured to: use the inter-frequency and inter-PLMN discovery announcement rate information and monitoring control configuration information for a list of non-serving cells that are geographically proximal to a serving cell of the serving PLMN for each cell carrier frequency of a one or more non-serving PLMNs and indexed by a PLMN identification (ID) and Physical Cell IDs (PCIDs); use a higher layer signaling of transmission probabilities for the inter-frequency and inter-PLMN discovery announcement rate information and monitoring control configuration information, wherein the higher layer signaling configures: an announcement rate for the UE in an SIB19 of particular pool in a serving cell frequency controlled by the serving PLMN; an inter-PLMN discovery announcement rate information in a frequency list of SIB19 of the serving cell frequency; or a dedicated discovery pool or a sub-pool for inter-frequency and inter-PLMN discovery.

Example 32 includes the apparatus of example 25, wherein the higher layer signaling configures: a transmission (TX) discovery pool for transmission of discovery messages on the one or more carrier frequencies of the non-serving PLMN such that the UE transmits on every K-th period of the discovery pool configured in the one of a plurality of carrier frequencies, where K is a positive integer greater than 1; a time interval for inter-frequency discovery announcement or monitoring on top of an existing discovery pool configurations, wherein the time interval is dependent on a PLMN identity; use a configuration of transmission probabilities, a discovery announcement rate, a dedicated discovery pool, and a time period for inter-frequency discovery announcement as a function of a PLMN identity; perform inter-PLMN discovery announcement and monitoring using PLMN identity dependent scheduling for discovery announcement across a plurality of carrier frequencies; perform inter-PLMN discovery announcement and monitoring using randomization of discovery announcement and discovery monitoring intervals based on one or more of a plurality of different identities; or use a physical structure of a discovery signaling comprising a demodulation reference signals (DMRS) sequence, a DMRS orthogonal cover code sequence, DMRS cyclic shift, a discovery hopping within discovery pool, a discovery signal physical structure that is a function of a PLMN identity, or a combination thereof.

Example 33 includes the apparatus of example 25, wherein the apparatus includes at least one of an antenna, a touch sensitive display screen, a speaker, a microphone, a graphics processor, an application processor, internal memory, a non-volatile memory port, and combinations thereof.

Example 34 includes an apparatus of a user equipment (UE), the UE configured to perform inter-frequency and inter-public land mobile network (PLMN) discovery, the apparatus comprising one or more processors and memory configured to: receive, from an eNodeB, a serving PLMN system information block (SIB)19 for a carrier frequency of a serving PLMN of the UE; acquire inter-frequency and inter-PLMN discovery system information acquisition assistance signaling information from the SIB19; process, using the inter-frequency and inter-PLMN discovery system information acquisition assistance signaling information, a non-serving PLMN SIB19 for one or more carriers frequency of a non-serving PLMN to enable the UE to perform device-to-device (D2D) discovery with a UE in the non-serving PLMN according to the inter-frequency and inter-PLMN discovery announcement rate information and monitoring control configuration information.

Example 35 includes the apparatus of example 34, wherein the one or more processors and memory are further configured to identify inter-frequency and inter-PLMN discovery announcement rate information and monitoring control configuration information for the one or more carrier's frequency of the non-serving PLMN.

Example 36 includes the apparatus of example 34, wherein the inter-frequency and inter-PLMN discovery system information acquisition assistance signaling information includes inter-frequency scheduling information that includes carrier bandwidth, power control information, system information radio network temporary identifier (SI-RNTI), SIB1 scheduling information, and SIB19 scheduling information.

Example 37 includes the apparatus of example 34, wherein the inter-frequency and inter-PLMN discovery system information acquisition assistance signaling information includes information regarding a time window for inter-frequency and inter-PLMN discovery.

Example 38 includes the apparatus of example 34, wherein the one or more processors and memory are further configured to indicate acquisition assistance signaling after receiving from the inter-frequency and inter-PLMN discovery system information acquisition assistance signaling information that includes bandwidth, power control information, system information radio network temporary identifier (SI-RNTI), SIB1 scheduling information, and SIB19 scheduling information or the information regarding a time window for inter-frequency and inter-PLMN discovery.

Example 39 includes the apparatus of example 34, wherein the inter-frequency and inter-PLMN discovery system information acquisition assistance signaling information provides full discovery configuration information for intra-PLMN discovery announcement or monitoring comprising of a higher layer signaling of resource pool configuration for a plurality of cell frequencies served by the serving PLMN, and a higher layer signaling of SIB19 scheduling information of the one or more carrier frequencies of the non-serving PLMN.

Example 40 includes the apparatus of example 34, wherein inter-frequency and inter-PLMN discovery system information acquisition assistance signaling information provides full discovery configuration information for inter-PLMN discovery announcement or monitoring comprising across a plurality of cell frequencies comprising of higher layer signaling of a resource pool configuration for a plurality of cell frequencies served by the serving PLMN, and higher layer signaling of a time window relative to the serving cell frequency to acquire an SIB19 transmitted at different cell frequencies relative to the serving cell, and higher layer signaling to indicate a change of the inter-frequency and inter-PLMN discovery announcement rate information and monitoring control configuration information on one a plurality of inter-frequency within a broadcasted inter-frequency list X2 signaling to exchange information about the inter-frequency and inter-PLMN discovery announcement rate information and monitoring control configuration information for a plurality of PLMNs.

Example 41 includes the apparatus of example 34, wherein the one or more processors and memory are further configured to use the inter-frequency and inter-PLMN discovery announcement rate information and monitoring control configuration information for a list of non-serving cells that are geographically proximal to a serving cell of the serving PLMN for each cell carrier frequency of a one or more non-serving PLMNs and indexed by a PLMN identification (ID) and Physical Cell IDs (PCIDs).

Example 42 includes the apparatus of example 34, wherein the one or more processors and memory are further configured to use a higher layer signaling of transmission probabilities for the inter-frequency and inter-PLMN discovery announcement rate information and monitoring control configuration information, wherein the higher layer signaling configures: an announcement rate for the UE in an SIB19 of particular pool in a serving cell frequency controlled by the serving PLMN; an inter-PLMN discovery announcement rate information in a frequency list of SIB19 of the serving cell frequency; or a dedicated discovery pool or a sub-pool for inter-frequency and inter-PLMN discovery.

Example 43 includes the apparatus of example 42, wherein the higher layer signaling configures: a transmission (TX) discovery pool for transmission of discovery messages on the one or more carrier frequencies of the non-serving PLMN such that the UE transmits on every K-th period of the discovery pool configured in the one of a plurality of carrier frequencies, where K is a positive integer greater than 1; or a time interval for inter-frequency discovery announcement or monitoring on top of an existing discovery pool configurations, wherein the time interval is dependent on a PLMN identity.

Example 44 includes the apparatus of example 34, wherein the one or more processors and memory are further configured to use a configuration of transmission probabilities, a discovery announcement rate, a dedicated discovery pool, and a time period for inter-frequency discovery announcement as a function of a PLMN identity.

Example 45 includes the apparatus of example 34, wherein the one or more processors and memory are further configured to: perform inter-PLMN discovery announcement and monitoring using PLMN identity dependent scheduling for discovery announcement across a plurality of carrier frequencies; perform inter-PLMN discovery announcement and monitoring using randomization of discovery announcement and discovery monitoring intervals based on one or more of a plurality of different identities; or use a physical structure of a discovery signaling comprising a demodulation reference signals (DMRS) sequence, a DMRS orthogonal cover code sequence, DMRS cyclic shift, a discovery hopping within discovery pool, a discovery signal physical structure that is a function of a PLMN identity, or a combination thereof.

Example 46 includes an apparatus of an eNodeB, the eNodeB configured to a assist an user equipment (UE) to perform inter-frequency and inter-public land mobile network (PLMN) discovery, the apparatus comprising one or more processors and memory configured to: process, for transmission to the UE, a serving PLMN system information block (SIB)19 for a carrier frequency of a serving PLMN of the UE to enable the UE to acquire inter-frequency and inter-PLMN discovery system information acquisition assistance signaling information from the SIB 19; process, for transmission to the UE, using the inter-frequency and inter-PLMN discovery system information acquisition assistance signaling information, a non-serving PLMN SIB19 for one or more carrier frequencies of a non-serving PLMN to enable the UE identify inter-frequency and inter-PLMN discovery announcement rate information and monitoring control configuration information for the one or more carrier frequencies of the non-serving PLMN to enable the UE to perform device-to-device (D2D) discovery with a UE in the non-serving PLMN according to the inter-frequency and inter-PLMN discovery announcement rate information and monitoring control configuration information.

Example 47 includes the apparatus of example 46, wherein the one or more processors and memory are further configured to: process the inter-frequency and inter-PLMN discovery system information acquisition assistance signaling information received from one or more non-serving PLMNs or from one or more non-serving cells.

Example 48 includes the apparatus of example 47, wherein the inter-frequency and inter-PLMN discovery system information acquisition assistance signaling information enables the UE to perform device-to-device (D2D) discovery with a UE in the non-serving PLMN according to the inter-frequency and inter-PLMN discovery announcement rate information and monitoring control configuration information.

Example 49 includes an apparatus of a user equipment (UE), the UE configured to perform inter-frequency and inter-public land mobile network (PLMN) discovery, the apparatus comprising one or more processors and memory configured to: receive, from an eNodeB, a serving PLMN system information block (SIB)19 for a carrier frequency of a serving PLMN of the UE; acquire inter-frequency and inter-PLMN discovery system information acquisition assistance signaling information from the SIB19; process a non-serving PLMN SIB19 for one or more carrier frequencies of a non-serving PLMN using the inter-frequency and inter-PLMN discovery system information acquisition assistance signaling information; and identify inter-frequency and inter-PLMN discovery announcement rate information and monitoring control configuration information for the one or more carrier frequencies of the non-serving PLMN to enable the UE to perform device-to-device (D2D) discovery with a UE in the non-serving PLMN according to the inter-frequency and inter-PLMN discovery announcement rate information and monitoring control configuration information.

Example 50 includes the apparatus of example 49, wherein the inter-frequency and inter-PLMN discovery system information acquisition assistance signaling information includes inter-frequency scheduling information that includes carrier bandwidth, power information, system information radio network temporary identifier (SI-RNTI), SIB1 scheduling information, and SIB19 scheduling information, or information regarding a time window for inter-frequency and inter-PLMN discovery.

Example 51 includes the apparatus of example 49 or 50, wherein the one or more processors and memory are further configured to indicate acquisition assistance signaling after receiving from the inter-frequency and inter-PLMN discovery system information acquisition assistance signaling information that includes bandwidth, power, system information radio network temporary identifier (SI-RNTI), SIB1 scheduling information, and SIB19 scheduling information or the information regarding a time window for inter-frequency and inter-PLMN discovery.

In Example 52, the subject matter of Example 49 or any of the Examples described herein may further include, wherein the inter-frequency and inter-PLMN discovery announcement rate information and monitoring control configuration information provides full discovery configuration information for intra-PLMN discovery announcement or monitoring comprising of a higher layer signaling of resource pool configuration for a plurality of cell frequencies served by the serving PLMN, and a higher layer signaling of SIB19 scheduling information of the one or more carrier frequencies of the non-serving PLMN, or full discovery configuration information for inter-PLMN discovery announcement or monitoring comprising across a plurality of cell frequencies comprising of higher layer signaling of a resource pool configuration for a plurality of cell frequencies served by the serving PLMN, and higher layer signaling of a time window relative to the serving cell frequency to acquire an SIB19 transmitted at different cell frequencies relative to the serving cell, and higher layer signaling to indicate a change of the inter-frequency and inter-PLMN discovery announcement rate information and monitoring control configuration information on one a plurality of inter-frequency within a broadcasted inter-frequency list X2 signaling to exchange information about the inter-frequency and inter-PLMN discovery announcement rate information and monitoring control configuration information for a plurality of PLMNs.

Example 53 includes the apparatus of example 52, wherein the one or more processors and memory are further configured to: use the inter-frequency and inter-PLMN discovery announcement rate information and monitoring control configuration information for a list of non-serving cells that are geographically proximal to a serving cell of the serving PLMN for each cell carrier frequency of a one or more non-serving PLMNs and indexed by a PLMN identification (ID) and Physical Cell IDs (PCIDs); use a higher layer signaling of transmission probabilities for the inter-frequency and inter-PLMN discovery announcement rate information and monitoring control configuration information, wherein the higher layer signaling configures: an announcement rate for the UE in an SIB19 of particular pool in a serving cell frequency controlled by the serving PLMN; an inter-PLMN discovery announcement rate information in a frequency list of SIB19 of the serving cell frequency; a dedicated discovery pool or a sub-pool for inter-frequency and inter-PLMN discovery; a transmission (TX) discovery pool for transmission of discovery messages on the one or more carrier frequencies of the non-serving PLMN such that the UE transmits on every K-th period of the discovery pool configured in the one of a plurality of carrier frequencies, where K is a positive integer greater than 1; a time interval for inter-frequency discovery announcement or monitoring on top of an existing discovery pool configurations, wherein the time interval is dependent on a PLMN identity; use a configuration of transmission probabilities, a discovery announcement rate, a dedicated discovery pool, and a time period for inter-frequency discovery announcement as a function of a PLMN identity; perform inter-PLMN discovery announcement and monitoring using PLMN identity dependent scheduling for discovery announcement across a plurality of carrier frequencies; perform inter-PLMN discovery announcement and monitoring using randomization of discovery announcement and discovery monitoring intervals based on one or more of a plurality of different identities; or use a physical structure of a discovery signaling comprising a demodulation reference signals (DMRS) sequence, a DMRS orthogonal cover code sequence, DMRS cyclic shift, a discovery hopping within discovery pool, a discovery signal physical structure that is a function of a PLMN identity, or a combination thereof.

In Example 54, the subject matter of Example 49 or any of the Examples described herein may further include 49-53, wherein the apparatus includes at least one of an antenna, a touch sensitive display screen, a speaker, a microphone, a graphics processor, an application processor, internal memory, a non-volatile memory port, and combinations thereof.

Example 55 apparatus of a user equipment (UE), the UE configured to perform inter-frequency and inter-public land mobile network (PLMN) discovery, the apparatus comprising one or more processors and memory configured to: receive, from an eNodeB, a serving PLMN system information block (SIB)19 for a carrier frequency of a serving PLMN of the UE; acquire inter-frequency and inter-PLMN discovery system information acquisition assistance signaling information from the SIB19; and process, using the inter-frequency and inter-PLMN discovery system information acquisition assistance signaling information, a non-serving PLMN SIB19 for one or more carriers frequency of a non-serving PLMN to enable the UE to perform device-to-device (D2D) discovery with a UE in the non-serving PLMN according to the inter-frequency and inter-PLMN discovery announcement rate information and monitoring control configuration information.

Example 56 includes the apparatus of example 55, wherein the one or more processors and memory are further configured to identify inter-frequency and inter-PLMN discovery announcement rate information and monitoring control configuration information for the one or more carrier's frequency of the non-serving PLMN.

Example 57 includes the apparatus of example 55 or 56, wherein the inter-frequency and inter-PLMN discovery system information acquisition assistance signaling information includes inter-frequency scheduling information that includes carrier bandwidth, power control information, system information radio network temporary identifier (SI-RNTI), SIB1 scheduling information, and SIB19 scheduling information, or information regarding a time window for inter-frequency and inter-PLMN discovery.

In Example 58, the subject matter of Example 55 or any of the Examples described herein may further include, wherein the one or more processors and memory are further configured to indicate acquisition assistance signaling after receiving from the inter-frequency and inter-PLMN discovery system information acquisition assistance signaling information that includes bandwidth, power control information, system information radio network temporary identifier (SI-RNTI), SIB1 scheduling information, and SIB19 scheduling information or the information regarding a time window for inter-frequency and inter-PLMN discovery, wherein the inter-frequency and inter-PLMN discovery system information acquisition assistance signaling information provides full discovery configuration information for intra-PLMN discovery announcement or monitoring comprising of a higher layer signaling of resource pool configuration for a plurality of cell frequencies served by the serving PLMN, and a higher layer signaling of SIB19 scheduling information of the one or more carrier frequencies of the non-serving PLMN.

In Example 59, the subject matter of Example 55 or any of the Examples described herein may further include, wherein inter-frequency and inter-PLMN discovery system information acquisition assistance signaling information provides full discovery configuration information for inter-PLMN discovery announcement or monitoring comprising across a plurality of cell frequencies comprising of higher layer signaling of a resource pool configuration for a plurality of cell frequencies served by the serving PLMN, and higher layer signaling of a time window relative to the serving cell frequency to acquire an SIB19 transmitted at different cell frequencies relative to the serving cell, and higher layer signaling to indicate a change of the inter-frequency and inter-PLMN discovery announcement rate information and monitoring control configuration information on one a plurality of inter-frequency within a broadcasted inter-frequency list X2 signaling to exchange information about the inter-frequency and inter-PLMN discovery announcement rate information and monitoring control configuration information for a plurality of PLMNs.

In Example 60, the subject matter of Example 55 or any of the Examples described herein may further include, wherein the one or more processors and memory are further configured to use the inter-frequency and inter-PLMN discovery announcement rate information and monitoring control configuration information for a list of non-serving cells that are geographically proximal to a serving cell of the serving PLMN for each cell carrier frequency of a one or more non-serving PLMNs and indexed by a PLMN identification (ID) and Physical Cell IDs (PCIDs).

In Example 61, the subject matter of Example 55 or any of the Examples described herein may further include, wherein the one or more processors and memory are further configured to use a higher layer signaling of transmission probabilities for the inter-frequency and inter-PLMN discovery announcement rate information and monitoring control configuration information, wherein the higher layer signaling configures: an announcement rate for the UE in an SIB19 of particular pool in a serving cell frequency controlled by the serving PLMN; an inter-PLMN discovery announcement rate information in a frequency list of SIB19 of the serving cell frequency; a dedicated discovery pool or a sub-pool for inter-frequency and inter-PLMN discovery; a transmission (TX) discovery pool for transmission of discovery messages on the one or more carrier frequencies of the non-serving PLMN such that the UE transmits on every K-th period of the discovery pool configured in the one of a plurality of carrier frequencies, where K is a positive integer greater than 1; or a time interval for inter-frequency discovery announcement or monitoring on top of an existing discovery pool configurations, wherein the time interval is dependent on a PLMN identity.

Example 62 includes the apparatus of example 55-61, wherein the one or more processors and memory are further configured to: use a configuration of transmission probabilities, a discovery announcement rate, a dedicated discovery pool, and a time period for inter-frequency discovery announcement as a function of a PLMN identity; perform inter-PLMN discovery announcement and monitoring using PLMN identity dependent scheduling for discovery announcement across a plurality of carrier frequencies; perform inter-PLMN discovery announcement and monitoring using randomization of discovery announcement and discovery monitoring intervals based on one or more of a plurality of different identities; or use a physical structure of a discovery signaling comprising a demodulation reference signals (DMRS) sequence, a DMRS orthogonal cover code sequence, DMRS cyclic shift, a discovery hopping within discovery pool, a discovery signal physical structure that is a function of a PLMN identity, or a combination thereof.

Example 63 includes apparatus of an eNodeB, the eNodeB configured to a assist an user equipment (UE) to perform inter-frequency and inter-public land mobile network (PLMN) discovery, the apparatus comprising one or more processors and memory configured to: process, for transmission to the UE, a serving PLMN system information block (SIB)19 for a carrier frequency of a serving PLMN of the UE to enable the LIE to acquire inter-frequency and inter-PLMN discovery system information acquisition assistance signaling information from the SIB19; process, for transmission to the UE, using the inter-frequency and inter-PLMN discovery system information acquisition assistance signaling information, a non-serving PLMN SIB19 for one or more carrier frequencies of a non-serving PLMN to enable the UE identify inter-frequency and inter-PLMN discovery announcement rate information and monitoring control configuration information for the one or more carrier frequencies of the non-serving PLMN to enable the UE to perform device-to-device (D2D) discovery with a UE in the non-serving PLMN according to the inter-frequency and inter-PLMN discovery announcement rate information and monitoring control configuration information.

Example 64 includes a device to perform inter-frequency and inter-public land mobile network (PLMN) discovery, the device comprising : means for processing a serving PLMN system information block (SIB)19, that is received from an eNodeB, for a carrier frequency of a serving PLMN of the UE; means for acquiring from the SIB19 inter-frequency and inter-PLMN discovery system information acquisition assistance signaling information; means for processing a non-serving PLMN SIB19 for one or more carrier frequencies of a non-serving PLMN using the inter-frequency and inter-PLMN discovery system information acquisition assistance signaling information; and means for identifying inter-frequency and inter-PLMN discovery announcement rate information and monitoring control configuration information for the one or more carrier frequencies of the non-serving PLMN to enable the UE to perform device-to-device (D2D) discovery with a UE in the non-serving PLMN according to the inter-frequency and inter-PLMN discovery announcement rate information and monitoring control configuration information.

As used herein, the term “circuitry” can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The node and wireless device can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module may not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology can be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE), the UE configured to perform inter-frequency and inter-public land mobile network (PLMN) discovery, the apparatus comprising one or more processors and memory configured to:

process a serving PLMN system information block (SIB) 19, received from an eNodeB, for a carrier frequency of a serving PLMN of the UE;

acquire inter-frequency and inter-PLMN discovery system information acquisition assistance signaling information from the SIB19;

process a non-serving PLMN SIB19 for one or more carrier frequencies of a non-serving PLMN using the inter-frequency and inter-PLMN discovery system information acquisition assistance signaling information acquired from the serving PLMN SIB19;

identify inter-frequency and inter-PLMN discovery announcement rate information and monitoring control configuration information for the one or more carrier frequencies of the non-serving PLMN using the non-serving PLMN SIB19 to enable the UE to perform device-to-device (D2D) discovery with a UE in the non-serving PLMN according to the inter-frequency and inter-PLMN discovery announcement rate information and monitoring control configuration information;

use a configuration of transmission probabilities, a discovery announcement rate, a dedicated discovery pool, and a time period for inter-frequency discovery announcement as a function of a PLMN identity;

perform inter-PLMN discovery announcement and monitoring using PLMN identity dependent scheduling for discovery announcement across a plurality of carrier frequencies;

perform inter-PLMN discovery announcement and monitoring using randomization of discovery announcement and discovery monitoring intervals based on one or more of a plurality of different identities; and use a physical structure of a discovery signaling comprising a demodulation reference signals (DMRS) sequence, a DMRS orthogonal cover code sequence, DMRS cyclic shift, a discovery hopping within discovery pool, a discovery signal physical structure that is a function of a PLMN identity, or a combination thereof, or use a higher layer signaling of transmission probabilities for the inter-frequency and inter-PLMN discover announcement rate information and monitoring control configuration information, wherein the higher layer signaling configures:

a transmission (TX) discover pool for transmission of discovery messages on the one or more carrier frequencies of the non-serving PLMN such that the UE transmits on every K-th period of the discovery pool configured in the one of a plurality of carrier frequencies, where K is a positive integer greater than 1;

a time interval for inter-frequency discovery announcement or monitoring on top of an existing discovery pool configurations, wherein the time interval is dependent on a PLMN identity.

2. The apparatus of claim 1, wherein the inter-frequency and inter-PLMN discovery system information acquisition assistance signaling information includes inter-frequency scheduling information that includes carrier bandwidth, power information, system information radio network temporary identifier (SI-RNTI), SIB1 scheduling information, and SIB19 scheduling information.

3. The apparatus of claim 1, wherein the inter-frequency and inter-PLMN discovery system information acquisition assistance signaling information includes information regarding a time window for inter-frequency and inter-PLMN discovery.

4. The apparatus of claim 1, wherein the one or more processors and memory are further configured to indicate acquisition assistance signaling after receiving from the inter-frequency and inter-PLMN discovery system information acquisition assistance signaling information that includes bandwidth, power, system information radio network temporary identifier (SI-RNTI), SIB1 scheduling information, and SIB19 scheduling information or the information regarding a time window for inter-frequency and inter-PLMN discovery.

5. The apparatus of claim 1, wherein the inter-frequency and inter-PLMN discovery announcement rate information and monitoring control configuration information provides full discovery configuration information for intra-PLMN discovery announcement or monitoring comprising of a higher layer signaling of resource pool configuration for a plurality of cell frequencies served by the serving PLMN, and a higher layer signaling of SIB19 scheduling information of the one or more carrier frequencies of the non-serving PLMN.

6. The apparatus of claim 1, wherein the inter-frequency and inter-PLMN discovery announcement rate information and monitoring control configuration information provides full discovery configuration information for inter-PLMN discovery announcement or monitoring comprising across a plurality of cell frequencies comprising of higher layer signaling of a resource pool configuration for a plurality of cell frequencies served by the serving PLMN, and higher layer signaling of a time window relative to the serving cell frequency to acquire an SIB19 transmitted at different cell frequencies relative to the serving cell, and higher layer signaling to indicate a change of the inter-frequency and inter-PLMN discovery announcement rate information and monitoring control configuration information on one a plurality of inter-frequency within a broadcasted inter-frequency list X2 signaling to exchange information about the inter-frequency and inter-PLMN discovery announcement rate information and monitoring control configuration information for a plurality of PLMNs.

7. The apparatus of claim 6, wherein the one or more processors and memory are further configured to:

use the inter-frequency and inter-PLMN discovery announcement rate information and monitoring control configuration information for a list of non-serving cells that are geographically proximal to a serving cell of the serving PLMN for each cell carrier frequency of a one or more non-serving PLMNs and indexed by a PLMN identification (ID) and Physical Cell IDs (PCIDs); and use a higher layer signaling of transmission probabilities for the inter-frequency and inter-PLMN discovery announcement rate information and monitoring control configuration information, wherein the higher layer signaling configures:

an announcement rate for the UE in an SIB19 of particular pool in a serving cell frequency controlled by the serving PLMN;

an inter-PLMN discovery announcement rate information in a frequency list of SIB19 of the serving cell frequency; or a dedicated discovery pool or a sub-pool for inter-frequency and inter-PLMN discovery.

8. The apparatus of claim 1, wherein the apparatus includes at least one of an antenna, a touch sensitive display screen, a speaker, a microphone, a graphics processor, an application processor, internal memory, a non-volatile memory port, and combinations thereof.

9. An apparatus of a user equipment (UE), the UE configured to perform inter-frequency and inter-public land mobile network (PLMN) discovery, the apparatus comprising one or more processors and memory configured to:

process, a serving PLMN system information block (SIB) 19, received from an eNodeB, for a carrier frequency of a serving PLMN of the UE;

acquire inter-frequency and inter-PLMN discovery system information acquisition assistance signaling information from the SIB19;

process, using the inter-frequency and inter-PLMN discovery system information acquisition assistance signaling information, a non-serving PLMN SIB19 for one or more carriers frequency of a non-serving PLMN to enable the UE to perform device-to-device (D2D) discovery with a UE in the non-serving PLMN according to the inter-frequency and inter-PLMN discovery announcement rate information and monitoring control configuration information;

perform inter-PLMN discovery announcement and monitoring using PLMN identity dependent scheduling for discovery announcement across a plurality of carrier frequencies; and perform inter-PLMN discovery announcement and monitoring using randomization of discovery announcement and discovery monitoring intervals based on one or more of a plurality of different identities; or use a physical structure of a discovery signaling comprising a demodulation reference signals (DMRS) sequence, a DMRS orthogonal cover code sequence, DMRS cyclic shift, a discovery hopping within discovery pool, a discovery signal physical structure that is a function of a PLMN identity, or a combination thereof.

10. The apparatus of claim 9, wherein the one or more processors and memory are further configured to identify inter-frequency and inter-PLMN discovery announcement rate information and monitoring control configuration information for the one or more carriers frequency of the non-serving PLMN.

11. The apparatus of claim 9, wherein the inter-frequency and inter-PLMN discovery system information acquisition assistance signaling information includes inter-frequency scheduling information that includes carrier bandwidth, power control information, system information radio network temporary identifier (SI-RNTI), SIB1 scheduling information, and SIB19 scheduling information.

12. The apparatus of claim 9, wherein the inter-frequency and inter-PLMN discovery system information acquisition assistance signaling information includes information regarding a time window for inter-frequency and inter-PLMN discovery.

13. The apparatus of claim 9, wherein the one or more processors and memory are further configured to indicate acquisition assistance signaling after receiving from the inter-frequency and inter-PLMN discovery system information acquisition assistance signaling information that includes bandwidth, power control information, system information radio network temporary identifier (SI-RNTI), SIB1 scheduling information, and SIB19 scheduling information or the information regarding a time window for inter-frequency and inter-PLMN discovery.

14. The apparatus of claim 13, wherein the inter-frequency and inter-PLMN discovery system information acquisition assistance signaling information provides full discovery configuration information for intra-PLMN discovery announcement or monitoring comprising of a higher layer signaling of resource pool configuration for a plurality of cell frequencies served by the serving PLMN, and a higher layer signaling of SIB19 scheduling information of the one or more carrier frequencies of the non-serving PLMN.

15. The apparatus of claim 9, wherein inter-frequency and inter-PLMN discovery system information acquisition assistance signaling information provides full discovery configuration information for inter-PLMN discovery announcement or monitoring comprising across a plurality of cell frequencies comprising of higher layer signaling of a resource pool configuration for a plurality of cell frequencies served by the serving PLMN, and higher layer signaling of a time window relative to the serving cell frequency to acquire an SIB19 transmitted at different cell frequencies relative to the serving cell, and higher layer signaling to indicate a change of the inter-frequency and inter-PLMN discovery announcement rate information and monitoring control configuration information on one a plurality of inter-frequency within a broadcasted inter-frequency list X2 signaling to exchange information about the inter-frequency and inter-PLMN discovery announcement rate information and monitoring control configuration information for a plurality of PLMNs.

16. The apparatus of claim 9, wherein the one or more processors and memory are further configured to use the inter-frequency and inter-PLMN discovery announcement rate information and monitoring control configuration information for a list of non-serving cells that are geographically proximal to a serving cell of the serving PLMN for each cell carrier frequency of a one or more non-serving PLMNs and indexed by a PLMN identification (ID) and Physical Cell IDs (PCIDs).

17. The apparatus of claim 9, wherein the one or more processors and memory are further configured to use a higher layer signaling of transmission probabilities for the inter-frequency and inter-PLMN discovery announcement rate information and monitoring control configuration information, wherein the higher layer signaling configures:

an announcement rate for the UE in an SIB19 of particular pool in a serving cell frequency controlled by the serving PLMN;

an inter-PLMN discovery announcement rate information in a frequency list of SIB19 of the serving cell frequency; or a dedicated discovery pool or a sub-pool for inter-frequency and inter-PLMN discovery.

18. The apparatus of claim 17, wherein the higher layer signaling configures:

a transmission (TX) discovery pool for transmission of discovery messages on the one or more carrier frequencies of the non-serving PLMN such that the UE transmits on every K-th period of the discovery pool configured in the one of a plurality of carrier frequencies, where K is a positive integer greater than 1; or a time interval for inter-frequency discovery announcement or monitoring on top of an existing discovery pool configurations, wherein the time interval is dependent on a PLMN identity.

19. The apparatus of claim 9, wherein the one or more processors and memory are further configured to use a configuration of transmission probabilities, a discovery announcement rate, a dedicated discovery pool, and a time period for inter-frequency discovery announcement as a function of a PLMN identity.

20. An apparatus of an eNodeB, the eNodeB configured to assist a user equipment (UE) to perform inter-frequency and inter-public land mobile network (PLMN) discovery, the apparatus comprising one or more processors and memory configured to:

process, for transmission to the UE, a serving PLMN system information block (SIB)19 for a carrier frequency of a serving PLMN of the UE to enable the UE to acquire inter-frequency and inter-PLMN discovery system information acquisition assistance signaling information from the SIB19; and process, for transmission to the UE, using the inter-frequency and inter-PLMN discovery system information acquisition assistance signaling information, a non-serving PLMN SIB19 for one or more carrier frequencies of a non-serving PLMN to enable the UE to identify inter-frequency and inter-PLMN discovery announcement rate information and monitoring control configuration information for the one or more carrier frequencies of the non-serving PLMN to enable the UE to perform device-to-device (D2D) discovery with a UE in the non-serving PLMN according to the inter-frequency and inter-PLMN discovery announcement rate information and monitoring control configuration information;

to enable the UE to:

perform inter-PLMN discovery announcement and monitoring using PLMN identity dependent scheduling for discovery announcement across a plurality of carrier frequencies; and perform inter-PLMN discovery announcement and monitoring using randomization of discovery announcement and discovery monitoring intervals based on one or more of a plurality of different identities; or use a physical structure of a discovery signaling comprising a demodulation reference signals (DMRS) sequence, a DMRS orthogonal cover code sequence, DMRS cyclic shift, a discovery hopping within discovery pool, a discovery signal physical structure that is a function of a PLMN identity, or a combination thereof.

21. The apparatus of claim 20, wherein the one or more processors and memory are further configured to: process the inter-frequency and inter-PLMN discovery system information acquisition assistance signaling information received from one or more non-serving PLMNs or from one or more non-serving cells.

22. The apparatus of claim 20, wherein the inter-frequency and inter-PLMN discovery system information acquisition assistance signaling information enables the UE to perform device-to-device (D2D) discovery with a UE in the non-serving PLMN according to the inter-frequency and inter-PLMN discovery announcement rate information and monitoring control configuration information.

* * * * *